US012747152B2

(12) United States Patent
Rothwell

(10) Patent No.: US 12,747,152 B2
(45) Date of Patent: Sep. 29, 2026

(54) ARTICLE FOR REFILLING AND REFILLING APPARATUS

(71) Applicant: NICOVENTURES TRADING LIMITED, London (GB)

(72) Inventor: Howard Rothwell, London (GB)

(73) Assignee: NICOVENTURES TRADING LIMITED, London (GB)

(*) Notice: Subject to any disclaimer, the term of this patent is extended or adjusted under 35 U.S.C. 154(b) by 0 days.

(21) Appl. No.: 18/688,984

(22) PCT Filed: Aug. 26, 2022

(86) PCT No.: PCT/GB2022/052197

§ 371 (c)(1),
(2) Date: Mar. 4, 2024

(87) PCT Pub. No.: WO2023/031586

PCT Pub. Date: Mar. 9, 2023

(65) Prior Publication Data

US 2025/0002326 A1 Jan. 2, 2025

(30) Foreign Application Priority Data

Sep. 3, 2021 (GB) ...................................... 2112575
Sep. 3, 2021 (GB) ...................................... 2112577

(51) Int. Cl.
*B67D 7/02* (2010.01)
*A24F 40/10* (2020.01)
(Continued)

(52) U.S. Cl.
CPC ................ *B67D 7/02* (2013.01); *A24F 40/10* (2020.01); *A24F 40/42* (2020.01); *A24F 40/485* (2020.01)

(58) Field of Classification Search
CPC ...... B65D 51/18; B65D 51/22; B65D 51/226; A24F 40/485; A24F 40/10; A24F 40/42
See application file for complete search history.

(56) References Cited

U.S. PATENT DOCUMENTS 2,020,828 A * 11/1935 Goldberg ................ A61J 1/062 604/243
4,684,365 A * 8/1987 Reinicke ........... A61M 5/14276 604/126
(Continued)

FOREIGN PATENT DOCUMENTS

CN 110960420 A 4/2020
CN 113057382 A 7/2021
(Continued)

OTHER PUBLICATIONS

PCT International Search Report and Written Opinion in International Appln. No. PCT/GB2022/052197, dated Feb. 17, 2023, 25 pages.

*Primary Examiner* — Timothy L Maust
(74) *Attorney, Agent, or Firm* — MERCHANT & GOULD P.C.

(57) ABSTRACT

An article for storing aerosol-generating material and configured to be refilled with aerosol-generating material from a refilling device, the article including a storage area for storing the aerosol-generating material; a valve arrangement in communication with the storage area, the valve arrangement including a septum arranged to cover an opening of the article in communication with the storage area, the septum including a first layer and a second layer, wherein the first layer is formed of a material that is relatively harder than a material forming the second layer. Also described is a refill reservoir having a valve arrangement including a septum, as well as a system and a method.

18 Claims, 10 Drawing Sheets

(51) Int. Cl.
*A24F 40/42* (2020.01)
*A24F 40/485* (2020.01)

(56) References Cited

U.S. PATENT DOCUMENTS

| | | | | |
|---|---|---|---|---|
| 5,482,591 | A * | 1/1996 | Reo | B32B 5/024 442/236 |
| 6,162,206 | A * | 12/2000 | Bindokas | A61J 1/2096 604/905 |
| 8,356,645 | B2 * | 1/2013 | Chong | A61J 1/2089 141/2 |
| 10,307,550 | B2 * | 6/2019 | Stedman | B05B 17/0684 |
| 2004/0217082 | A1 | 11/2004 | Claessens | |
| 2009/0235619 | A1 | 9/2009 | Ostler et al. | |
| 2012/0053554 | A1 * | 3/2012 | Simpson | A61J 1/1406 604/411 |
| 2014/0066879 | A1 * | 3/2014 | Holtwick | A61J 1/2093 604/411 |
| 2014/0318533 | A1 * | 10/2014 | Patton | A61M 15/0085 128/200.14 |
| 2018/0279682 | A1 | 10/2018 | Guo et al. | |
| 2019/0001482 | A1 | 1/2019 | Wolle et al. | |
| 2019/0014822 | A1 | 1/2019 | Bless et al. | |
| 2019/0216134 | A1 | 7/2019 | Biel et al. | |
| 2020/0022417 | A1 | 1/2020 | Atkins et al. | |
| 2020/0113246 | A1 | 4/2020 | Barbaric et al. | |
| 2020/0114095 | A1 | 4/2020 | Holroyd et al. | |
| 2021/0120885 | A1 | 4/2021 | Xie | |

FOREIGN PATENT DOCUMENTS

| | | | |
|---|---|---|---|
| EP | 3298913 | B1 | 11/2020 |
| WO | 2020127479 | A1 | 6/2020 |
| WO | 2020127482 | A1 | 6/2020 |

* cited by examiner

ARTICLE FOR REFILLING AND REFILLING APPARATUS

RELATED APPLICATIONS

The present application is a National Phase entry of PCT Application PCT/GB2022/052197 filed Aug. 26, 2022, which claims priority to GB Application No. 2112575.2 filed Sep. 3, 2021 and GB Application No. 2112577.8 filed Sep. 3, 2021, each of which is hereby incorporated by reference in their entirety.

TECHNICAL FIELD

The present disclosure relates to an apparatus for refilling a reservoir of an electronic aerosol provision system and more specifically to the design of an apparatus for refilling a reservoir of an electronic aerosol provision system.

BACKGROUND

Electronic aerosol provision systems, which are often configured as so-called electronic cigarettes, can have a unitary format with all elements of the system in a common housing, or a multi-component format in which elements are distributed between two or more housings which can be coupled together to form the system. A common example of the latter format is a two-component system comprising a device and an article. The device typically contains an electrical power source for the system, such as a battery, and control electronics for operating elements in order to generate aerosol. The article, also referred to by terms including cartridge, cartomiser, consumable and clearomiser, typically contains a storage volume or area for holding a supply of aerosol-generating material from which the aerosol is generated, and in some instances an aerosol generator such as a heater operable to vaporize the aerosol-generating material. A similar three-component system may include a separate mouthpiece that attaches to the article. In many designs, the article is designed to be disposable, in that it is intended to be detached from the device and thrown away when the aerosol-generating material has been consumed. The user obtains a new article which has been prefilled with aerosol-generating material by a manufacturer and attaches it to the device for use. The device, in contrast, is intended to be used with multiple consecutive articles, with a capability to recharge the battery to allow prolonged operation.

While disposable articles, which may be called consumables, are convenient for the user, they may be considered wasteful of natural resources and hence detrimental to the environment. An alternative design of article is therefore known, which is configured to be refilled with aerosol-generating material by the user. This reduces waste, and can reduce the cost of electronic cigarette usage for the user. The aerosol-generating material may be provided in a bottle, for example, from which the user squeezes or drips a quantity of material into the article via a refilling orifice on the article. However, the act of refilling can be awkward and inconvenient, since the items are small and the volume of material involved is typically low. Alignment of the juncture between bottle and article can be difficult, with inaccuracies leading to spillage of the material. This is not only wasteful, but may also be dangerous. Aerosol-generating material frequently contains liquid nicotine, which can be poisonous if it makes contact with the skin.

Therefore, refilling units or devices have been proposed, which are configured to receive a bottle or other reservoir of aerosol-generating material plus a refillable cartridge, and to automate the transfer of the material from the former to the latter. Alternative, improved or enhanced features and designs for such refilling devices are therefore of interest.

SUMMARY

According to a first aspect of certain embodiments there is provided an article for storing aerosol-generating material and configured to be refilled with aerosol-generating material from a refilling device, the article including: a storage area for storing the aerosol-generating material; a valve arrangement in communication with the storage area, the valve arrangement comprising: a septum arranged to cover an opening of the article in communication with the storage area, the septum comprising a first layer and a second layer, wherein the first layer is formed of a material that is relatively harder than a material forming the second layer.

According to a second aspect of certain embodiments there is provided a refill reservoir article for storing aerosol-generating material and for use with a refilling device configured to refill an article with aerosol-generating material using the refilling device, the refill reservoir including: a storage area for storing the aerosol-generating material; a valve arrangement in communication with the storage area, the valve arrangement comprising: a septum arranged to cover an opening of the refill reservoir in communication with the storage area, the septum comprising a first layer and a second layer, wherein the first layer is formed of a material that is relatively harder than a material forming the second layer.

According to a third aspect of certain embodiments there is provided a system for refilling an article with aerosol-generating material, the system including: an article according to the first aspect; and a refilling device, the refilling device comprising at least one piercing element arranged to pierce the septum of the article according to the first aspect, the piercing element further configured for transferring aerosol-generating material to the storage area of the article via the septum.

According to a fourth aspect of certain embodiments there is provided a method of refilling a storage area of an article with aerosol-generating material from a refilling device, the article comprising a valve arrangement in communication with the storage area, the method including: engaging the article with the refilling device; using a piercing element of the refilling device to pierce a septum of the valve arrangement, wherein the septum is arranged to cover an opening of the article in communication with the storage area and comprises a first layer and a second layer, wherein the first layer is arranged further from the storage area than the second layer and is formed of a material that is relatively harder than a material forming the second layer; and transferring aerosol-generating material to the storage area of the article once the piercing element has pierced both the first and second layers of the septum.

According to a fifth aspect of certain embodiments there is provided a method of refilling a storage area of an article with aerosol-generating material from a refill reservoir using a refilling device, the refill reservoir comprising a valve arrangement in communication with a storage area of the refill reservoir, the method including: engaging the article with the refilling device; using a piercing element of the refilling device to pierce a septum of the valve arrangement, wherein the septum is arranged to cover an opening of the refill reservoir in communication with the storage area and comprises a first layer and a second layer, wherein the first layer is arranged further from the storage area than the second layer and is formed of a material that is relatively harder than a material forming the second layer; and transferring aerosol-generating material from the storage area of the refill reservoir once the piercing element has pierced both the first and second layers of the septum According to a sixth aspect of certain embodiments there is provided an article for storing aerosol-generating material and configured to be refilled with aerosol-generating material from a refilling means, the article including: storage means for storing the aerosol-generating material; valve means in communication with the storage means, the valve means comprising: septum means arranged to cover an opening of the article in communication with the storage means, the septum means comprising a first layer and a second layer, wherein the first layer is formed of a material that is relatively harder than a material forming the second layer.

According to a seventh aspect of certain embodiments there is provided a refill reservoir article for storing aerosol-generating material and for use with a refilling means configured to refill an article with aerosol-generating material using the refilling means, the refill reservoir including: storage means for storing the aerosol-generating material; valve means in communication with the storage means, the valve means comprising: septum means arranged to cover an opening of the refill reservoir in communication with the storage means, the septum means comprising a first layer and a second layer, wherein the first layer is formed of a material that is relatively harder than a material forming the second layer.

According to an eighth aspect of certain embodiments there is provided a refilling device for refilling an article for use with an aerosol provision device with aerosol-generating material, the refilling device including: a port for receiving at least the article to be refilled with aerosol-generating material; a transfer mechanism for causing aerosol-generating material to be transferred from a refill reservoir to an aerosol-generating material storage area of the article; and a nozzle arrangement arranged to engage with a valve arrangement including a septum, wherein the nozzle arrangement comprises an aerosol-generating material nozzle comprising a piercing element configured to pierce the septum, and wherein the aerosol-generating material nozzle comprises an aerosol-generating material pathway configured to allow aerosol-generating material to pass along the aerosol-generating material pathway via an aerosol-generating material opening in the aerosol-generating material nozzle, wherein the septum is arranged to cover an opening in at least one of the article and the refill reservoir.

According to a ninth aspect of certain embodiments there is provided an article for use with an aerosol provision device, the article configured to be refilled with aerosol-generating material using a refilling device, the article including: a storage area for storing the aerosol-generating material; a valve arrangement in communication with the storage area, the valve arrangement comprising a first septum arranged to cover a first opening of the article in communication with the storage area and a second septum arranged to cover a second opening of the article in communication with the storage area.

According to a tenth aspect of certain embodiments there is provided an article for use with an aerosol provision device, the article configured to be refilled with aerosol-generating material using a refilling device, the article including: a storage area for storing the aerosol-generating material; a valve arrangement in communication with the storage area, the valve arrangement comprising a septum arranged to cover an opening of the article in communication with the storage area, wherein the opening is sized so as to be able to simultaneously receive a first nozzle at a first location at which the first nozzle pierces the septum and a second nozzle at a second location at which the second nozzle pierces the septum.

According to a eleventh aspect of certain embodiments there is provided a refill reservoir for use with a refilling device configured to refill an article with aerosol-generating material using the refilling device, the refill reservoir including: a storage area for storing aerosol-generating material; a valve arrangement in communication with the storage area, the valve arrangement comprising a first septum arranged to cover a first opening of the refill reservoir in communication with the storage area and a second septum arranged to cover a second opening of the refill reservoir in communication with the storage area.

According to a twelfth aspect of certain embodiments there is provided a refill reservoir for use with a refilling device configured to refill an article with aerosol-generating material using the refilling device, the refill reservoir including: a storage area for storing aerosol-generating material; a valve arrangement in communication with the storage area, the valve arrangement comprising a septum arranged to cover an opening of the refill reservoir in communication with the storage area, wherein the opening is sized so as to be able to simultaneously receive a first nozzle at a first location at which the first nozzle pierces the septum and a second nozzle at a second location at which the second nozzle pierces the septum.

According to a thirteenth aspect of certain embodiments there is provided a system for refilling an article for use with an aerosol provision device with aerosol-generating material, the system including: the refilling device of the eighth aspect; and an article comprising a storage area for receiving aerosol-generating material.

According to a fourteenth aspect of certain embodiments there is provided a method of refilling a storage area of an article with aerosol-generating material from a refilling device, the refilling device comprising a nozzle arrangement arranged to be in fluid communication with a refill reservoir coupled to the refilling device and a transfer mechanism for causing aerosol-generating material to be transferred from the refill reservoir, the article comprising a valve arrangement in communication with the storage area, the method including: engaging the article with the port of a refilling device; using a piercing element of an aerosol-generating material delivery nozzle of the nozzle arrangement to pierce a septum of the valve arrangement of the article, wherein the septum is arranged to cover an opening of the article in communication with the storage area; and transferring aerosol-generating material to the storage area of the article along an aerosol-generating material pathway of the aerosol-generating material delivery nozzle and through an aerosol-generating material opening in the aerosol-generating material delivery nozzle once the piercing element has pierced the septum.

According to a fifteenth aspect of certain embodiments there is provided a method of refilling a storage area of an article with aerosol-generating material from a refilling device, the refilling device comprising a nozzle arrangement arranged to be in fluid communication with a refill reservoir coupled to the refilling device and a transfer mechanism for causing aerosol-generating material to be transferred from the refill reservoir, the refill reservoir comprising a valve arrangement, the method including: engaging the article with the port of a refilling device; using a piercing element of an aerosol-generating material extraction nozzle of the nozzle arrangement to pierce a septum of a valve arrangement of the refill reservoir, wherein the septum is arranged to cover an opening of the refill reservoir; and transferring aerosol-generating material from the refill reservoir along an aerosol-generating material pathway of the aerosol-generating material extraction nozzle via an aerosol-generating material opening in the aerosol-generating material extraction nozzle once the piercing element has pierced the septum.

According to a sixteenth aspect of certain embodiments there is provided a refilling device for refilling an article for use with an aerosol provision device with aerosol-generating material, the refilling device including: port means for receiving at least the article to be refilled with aerosol-generating material; transfer means for causing aerosol-generating material to be transferred from a refill reservoir to an aerosol-generating material storage means of the article; and nozzle means arranged to engage with valve means including septum means, wherein the nozzle means comprises aerosol-generating material nozzle means comprising piercing means configured to pierce the septum means, and wherein the aerosol-generating material nozzle means comprises an aerosol-generating material pathway configured to allow aerosol-generating material to pass along the aerosol-generating material pathway via an aerosol-generating material opening in the aerosol-generating material nozzle means, wherein the septum means is arranged to cover an opening in at least one of the article and the refill reservoir.

According to a seventeenth aspect of certain embodiments there is provided an article for use with an aerosol provision device, the article configured to be refilled with aerosol-generating material using refilling means, the article including: storage means for storing the aerosol-generating material; valve means in communication with the storage means, the valve means comprising a first septum means arranged to cover a first opening of the article in communication with the storage means and a second septum means arranged to cover a second opening of the article in communication with the storage means.

According to an eighteenth aspect of certain embodiments there is provided an article for use with an aerosol provision device, the article configured to be refilled with aerosol-generating material using refilling means, the article including: storage means for storing the aerosol-generating material; valve means in communication with the storage means, the valve means comprising septum means arranged to cover an opening of the article in communication with the storage means, wherein the opening is sized so as to be able to simultaneously receive first nozzle means at a first location at which the first nozzle means pierces the septum means and second nozzle means at a second location at which the second nozzle means pierces the septum means.

According to a ninetieth aspect of certain embodiments there is provided a refill reservoir for use with refilling means configured to refill an article with aerosol-generating material using the refilling means, the refill reservoir including: storage means for storing aerosol-generating material; valve means in communication with the storage means, the valve means comprising a first septum means arranged to cover a first opening of the refill reservoir in communication with the storage means and a second septum means arranged to cover a second opening of the refill reservoir in communication with the storage means.

According to a twentieth aspect of certain embodiments there is provided a refill reservoir for use with refilling means configured to refill an article with aerosol-generating material using the refilling means, the refill reservoir including: storage means for storing aerosol-generating material; valve means in communication with the storage means, the valve means comprising septum means arranged to cover an opening of the refill reservoir in communication with the storage means, wherein the opening is sized so as to be able to simultaneously receive a first nozzle at a first location at which the first nozzle pierces the septum means and a second nozzle at a second location at which the second nozzle pierces the septum means.

These and further aspects of the certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein.

BRIEF DESCRIPTION OF THE DRAWINGS

Various embodiments of the invention will now be described in detail by way of example only with reference to the following drawings in which:

FIG. 8A shows an article comprising a single septum for use with the nozzle arrangement and FIG. 8B shows an article comprising a plurality of septa for use with the nozzle arrangement according to aspects of the present disclosure;

DETAILED DESCRIPTION

Figure 1:
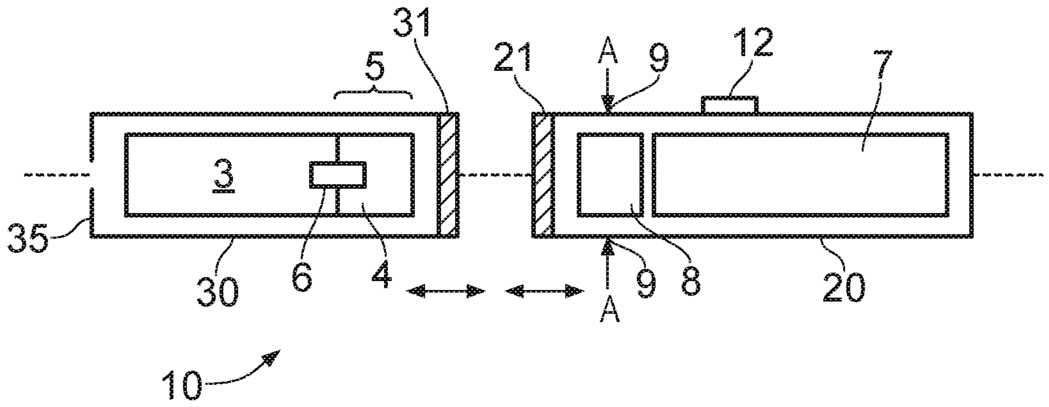
FIG. 1 shows a simplified schematic cross-section through an example electronic aerosol provision system to which embodiments of the present disclosure are applicable.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) electronic aerosol or vapor provision systems, such as e-cigarettes. Throughout the following description the terms "e-cigarette" and "electronic cigarette" may sometimes be used; however, it will be appreciated these terms may be used interchangeably with aerosol (vapor) provision system or device. The systems are intended to generate an inhalable aerosol by vaporization of a substrate (aerosol-generating material) in the form of a liquid or gel which may or may not contain nicotine. Additionally, hybrid systems may comprise a liquid or gel substrate plus a solid substrate which is also heated. The solid substrate may be for example tobacco or other non-tobacco products, which may or may not contain nicotine. The terms "aerosol-generating material" and "aerosolizable material" as used herein are intended to refer to materials which can form an aerosol, either through the application of heat or some other means. The term "aerosol" may be used interchangeably with "vapor".

As used herein, the terms "system" and "delivery system" are intended to encompass systems that deliver a substance to a user, and include non-combustible aerosol provision systems that release compounds from an aerosol-generating material without combusting the aerosol-generating material, such as electronic cigarettes, tobacco heating products, and hybrid systems to generate aerosol using a combination of aerosol-generating materials, and articles comprising aerosol-generating material and configured to be used within one of these non-combustible aerosol provision systems.

According to the present disclosure, a "non-combustible" aerosol provision system is one where a constituent aerosol-generating material of the aerosol provision system (or component thereof) is not combusted or burned in order to facilitate delivery of at least one substance of the aerosol-generating material to a user. In some embodiments, the delivery system is a non-combustible aerosol provision system, such as a powered non-combustible aerosol provision system. In some embodiments, the non-combustible aerosol provision system is an electronic cigarette, also known as a vaping device or electronic nicotine delivery (END) system, although it is noted that the presence of nicotine in the aerosol-generating material is not a requirement. In some embodiments, the non-combustible aerosol provision system is an aerosol-generating material heating system, also known as a heat-not-burn system. An example of such a system is a tobacco heating system. In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system comprises a liquid or gel aerosol generating material and a solid aerosol generating material. The solid aerosol generating material may comprise, for example, tobacco or a non-tobacco product.

Typically, the non-combustible aerosol provision system may comprise a non-combustible aerosol provision device and an article (consumable) for use with the non-combustible aerosol provision device. In some embodiments, the disclosure relates to consumables comprising aerosol-generating material and configured to be used with non-combustible aerosol provision devices. These consumables are sometimes referred to as articles throughout the disclosure. However, it is envisaged that articles which themselves comprise a means for powering an aerosol generator or aerosol generating component may themselves form the non-combustible aerosol provision system. In some embodiments, the non-combustible aerosol provision device may comprise a power source and a controller. The power source may, for example, be an electric power source. In some embodiments, the article for use with the non-combustible aerosol provision device may comprise an aerosol-generating material, an aerosol-generating component (aerosol generator), an aerosol-generating area, a mouthpiece, and/or an area for receiving and holding aerosol-generating material.

In some systems the aerosol-generating component or aerosol generator comprises a heater capable of interacting with the aerosol-generating material so as to release one or more volatiles from the aerosol-generating material to form an aerosol. However, the disclosure is not limited in this regard, and applies also to systems that use other approaches to form aerosol, such as a vibrating mesh.

In some embodiments, the article for use with the non-combustible aerosol provision device may comprise aerosol-generating material or an area for receiving aerosol-generating material. In some embodiments, the article for use with the non-combustible aerosol provision device may comprise a mouthpiece. The area for receiving aerosol-generating material may be a storage area for storing aerosol-generating material. For example, the storage area may be a reservoir which may store a liquid aerosol-generating material. In some embodiments, the area for receiving aerosol-generating material may be separate from, or combined with, an aerosol generating area (which is an area at which the aerosol is generated). In some embodiments, the article for use with the non-combustible aerosol provision device may comprise a filter and/or an aerosol-modifying agent through which generated aerosol is passed before being delivered to the user.

As used herein, the term "component" may be used to refer to a part, section, unit, module, assembly or similar of an electronic cigarette or similar device that incorporates several smaller parts or elements, possibly within an exterior housing or wall. An aerosol provision system such as an electronic cigarette may be formed or built from one or more such components, such as an article and a device, and the components may be removably or separably connectable to one another, or may be permanently joined together during manufacture to define the whole system. The present disclosure is applicable to (but not limited to) systems comprising two components separably connectable to one another and configured, for example, as an article in the form of an aerosol-generating material carrying component holding liquid or another aerosol-generating material (alternatively referred to as a cartridge, cartomiser, pod or consumable), and a device having a battery or other power source for providing electrical power to operate an aerosol generating component or aerosol generator for creating vapor/aerosol from the aerosol-generating material. A component may include more or fewer parts than those included in the examples.

In some examples, the present disclosure relates to aerosol provision systems and components thereof that utilize aerosol-generating material in the form of a liquid, gel or a solid which is held in an aerosol-generating material storage area such as a reservoir, tank, container or other receptacle comprised in the system, or absorbed onto a carrier substrate. An arrangement for delivering the aerosol-generating material from the aerosol-generating material storage area for the purpose of providing it to an aerosol generator for vapor/aerosol generation is included. The terms "liquid", "gel", "solid", "fluid", "source liquid", "source gel", "source fluid" and the like may be used interchangeably with terms such as "aerosol-generating material", "aerosolizable substrate material" and "substrate material" to refer to material that has a form capable of being stored and delivered in accordance with examples of the present disclosure.

As used herein, "aerosol-generating material" is a material that is capable of generating aerosol, for example when heated, irradiated or energized in any other way. Aerosol-generating material may, for example, be in the form of a solid, liquid or gel which may or may not contain an active substance and/or flavorants. In some embodiments, the aerosol-generating material may comprise an "amorphous solid", which may alternatively be referred to as a "monolithic solid" (i.e. non-fibrous). In some embodiments, the amorphous solid may be a dried gel. The amorphous solid is a solid material that may retain some fluid, such as liquid, within it. In some embodiments, the aerosol-generating material may for example comprise from about 50 wt %, 60 wt % or 70 wt % of amorphous solid, to about 90 wt %, 95 wt % or 100 wt % of amorphous solid. In some embodiments, the aerosol-generating material may comprise one or more active constituents, one or more flavors, one or more aerosol-former materials, and/or one or more other functional materials. The active substance as used herein may be a physiologically active material, which is a material intended to achieve or enhance a physiological response. The active substance may for example be selected from nutraceuticals, nootropics, psychoactives. The active substance may be naturally occurring or synthetically obtained. The active substance may comprise for example nicotine, caffeine, taurine, thiene, vitamins such as B6 or B12 or C, melatonin, cannabinoids, or constituents, derivatives, or combinations thereof. The active substance may comprise one or more constituents, derivatives or extracts of tobacco, *cannabis* or another botanical. As used herein, the terms "flavor" and "flavorant" refer to materials which, where local regulations permit, may be used to create a desired taste, aroma or other somatosensorial sensation in a product for adult consumers. They may include naturally occurring flavor materials, botanicals, extracts of botanicals, synthetically obtained materials, or combinations thereof. The aerosol-former material may comprise one or more constituents capable of forming an aerosol. In some embodiments, the aerosol-former material may comprise one or more of glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate. The one or more other functional materials may comprise one or more of pH regulators, coloring agents, preservatives, binders, fillers, stabilizers, and/or antioxidants.

FIG. 1 is a highly schematic diagram (not to scale) of an example electronic aerosol/vapor provision system 10, presented for the purpose of showing the relationship between the various parts of a typical system and explaining the general principles of operation. Note that the present disclosure is not limited to a system configured in this way, and features may be modified in accordance with the various alternatives and definitions described above and/or apparent to the skilled person.

The aerosol provision system 10 has a generally elongate shape in this example, extending along a longitudinal axis indicated by a dashed line, and comprises two main components, namely an aerosol provision device 20 (control or power component, section or unit), and an article or consumable 30 (cartridge assembly or section, sometimes referred to as a cartomiser, clearomiser or pod) carrying aerosol-generating material and operable to generate vapor/aerosol. In the following description, the aerosol provision system 10 is configured to generate aerosol from a liquid aerosol-generating material (source liquid), and the foregoing disclosure will explain the principles of the present disclosure using this example. However, the present disclosure is not limited to aerosolizing a liquid aerosol-generating material, and features may be modified in accordance with the various alternatives and definitions described above and/or apparent to the skilled person in order to aerosolize different aerosol-generating materials, e.g., solid aerosol-generating materials or gel aerosol-generating materials as described above.

The article 30 includes a reservoir 3 (as an example of an aerosol-generating material storage area) for containing a source liquid from which an aerosol is to be generated, for example containing nicotine. As an example, the source liquid may comprise around 1% to 3% nicotine and 50% glycerol, with the remainder comprising roughly equal measures of water and propylene glycol, and possibly also comprising other components, such as flavorings. Nicotine-free source liquid may also be used, such as to deliver flavoring. In some embodiments, a solid substrate (not illustrated), such as a portion of tobacco or other flavor imparting element through which vapor generated from the liquid is passed, may also be included. The reservoir 3 may have the form of a storage tank, being a container or receptacle in which source liquid can be stored such that the liquid is free to move and flow within the confines of the tank. In other examples, the storage area may comprise absorbent material (either inside a tank or similar, or positioned within the outer housing of the article) that substantially holds the aerosol-generating material. For a consumable article, the reservoir 3 may be sealed after filling during manufacture so as to be disposable after the source liquid is consumed. However, the present disclosure is relevant to refillable articles that have an inlet port, orifice or other opening (not shown in FIG. 1) through which new source liquid can be added to enable reuse of the article 30.

The article 30 also comprises an aerosol generator 5, which may have the form of an electrically powered heating element or heater 4 and an aerosol-generating material transfer component 6 designed to transfer aerosol-generating material from the aerosol-generating material storage area to the aerosol generator). The heater 4 is located externally of the reservoir 3 and is operable to generate the aerosol by vaporization of the source liquid by heating. The aerosol-generating material transfer component 6 is a transfer or delivery arrangement configured to deliver aerosol-generating material from the reservoir 3 to the heater 4. In some examples, it may have the form of a wick or other porous element (or more generally an aerosol-generating material transport element). A wick 6 may have one or more parts located inside the reservoir 3, or otherwise be in fluid communication with liquid in the reservoir 3, so as to be able to absorb source liquid and transfer it by wicking or capillary action to other parts of the wick 6 that are adjacent or in contact with the heater 4. The wick may be formed of any suitable material which can cause wicking of the liquid, such as glass fibers or cotton fibers. This wicked liquid is thereby heated and vaporized, and replacement liquid is drawn, via continuous capillary action, from the reservoir 3 for transfer to the heater 4 by the wick 6. The wick 6 may be thought of as a conduit between the reservoir 3 and the heater 4 that delivers or transfers liquid from the reservoir to the heater. In some implementations, the heater 4 and the aerosol-generating material transfer component 6 are unitary or monolithic, and formed from a same material that is able to be used for both liquid transfer and heating, such as a material which is both porous and conductive. In still other cases, the aerosol-generating material transfer component 6 may operate other than by capillary action, such as by comprising an arrangement of one or more valves by which liquid may exit the reservoir 3 and be passed onto the heater 4.

A heater and wick (or similar) combination, referred to herein as an aerosol generator 5, may sometimes be termed an atomiser or atomiser assembly, and the reservoir with its source liquid plus the atomiser may be collectively referred to as an aerosol source. Various designs are possible, in which the parts may be differently arranged compared with the highly schematic representation of FIG. 1. For example, and as mentioned above, the wick 6 may be an entirely separate element from the heater 4, or the heater 4 may be configured to be porous and able to perform at least part of the wicking function directly (a metallic mesh, for example).

In the present example, the system is an electronic system, and the heater 4 may comprise one or more electrical heating elements that operate by ohmic/resistive (Joule) heating. The article 30 may comprise electrical contacts (not shown) at an interface of the article 30 which electrically engage to electrical contacts (not shown) at an interface of the aerosol provision device 20. Electrical energy can therefore be transferred to the heater 4 via the electrical contacts from the aerosol provision device 20 to cause heating of the heater 4. In other examples, the heater 4 may be inductively heated, in which case the heater comprises a susceptor in an induction heating arrangement which may comprise a suitable drive coil through which an alternating electrical current is passed. A heater of this type could be configured in line with the examples and embodiments described in more detail below.

In general, therefore, an aerosol generator in the present context can be considered as one or more elements that implement the functionality of an aerosol-generating element able to generate vapor by heating source liquid (or other aerosol-generating material) delivered to it, and a liquid transport or delivery element able to deliver or transport liquid from a reservoir or similar liquid store to the vapor-generating element by a wicking action/capillary force or otherwise. An aerosol generator is typically housed in an article 30 of an aerosol generating system, as in FIG. 1, but in some examples, at least the heater part may be housed in the device 20. Embodiments of the disclosure are applicable to all and any such configurations which are consistent with the examples and description herein.

Returning to FIG. 1, the article 30 also includes a mouthpiece or mouthpiece portion 35 having an opening or air outlet through which a user may inhale the aerosol generated by the heater 4.

The aerosol provision device 20 includes a power source such as a cell or battery 7 (referred to hereinafter as a battery, and which may or may not be re-chargeable) to provide electrical power for electrical components of the aerosol provision system 10, in particular to operate the heater 4. Additionally, there is control circuitry 8 such as a printed circuit board and/or other electronics or circuitry for generally controlling the aerosol provision system 10. The control circuitry 8 may include a processor programmed with software, which may be modifiable by a user of the system. The control circuitry 8, in one aspect, operates the heater 4 using power from the battery 7 when vapor is required. At this time, the user inhales on the system 10 via the mouthpiece 35, and air A enters through one or more air inlets 9 in the wall of the device 20 (air inlets may alternatively or additionally be located in the article 30). When the heater 4 is operated, it vaporizes source liquid delivered from the reservoir 3 by the aerosol-generating material transfer component 6 to generate the aerosol by entrainment of the vapor into the air flowing through the system, and this is then inhaled by the user through the opening in the mouthpiece 35. The aerosol is carried from the aerosol generator 5 to the mouthpiece 35 along one or more air channels (not shown) that connect the air inlets 9 to the aerosol generator 5 to the air outlet when a user inhales on the mouthpiece 35.

More generally, the control circuitry 8 is suitably configured/programmed to control the operation of the aerosol provision system 10 to provide conventional operating functions of the aerosol provision system in line with established techniques for controlling such devices, as well as any specific functionality described as part of the foregoing disclosure. The control circuitry 8 may be considered to logically comprise various sub-units/circuitry elements associated with different aspects of the aerosol provision system's operation in accordance with the principles described herein and other conventional operating aspects of aerosol provision systems, such as display driving circuitry for systems that may include a user display (such as an screen or indicator) and user input detections via one or more user actuatable controls 12. It will be appreciated that the functionality of the control circuitry 8 can be provided in various different ways, for example using one or more suitably programmed programmable computers and/or one or more suitably configured application-specific integrated circuits/circuitry/chips/chipsets configured to provide the desired functionality. The device 20 and the article 30 are separate connectable parts detachable from one another by separation in a direction parallel to the longitudinal axis, as indicated by the double-headed arrows in FIG. 1. The components 20, 30 are joined together when the system 10 is in use by cooperating engagement elements 21, 31 (for example, a screw or bayonet fitting) which provide mechanical and in some cases electrical connectivity between the device 20 and the article 30. Electrical connectivity is required if the heater 4 operates by ohmic heating, so that current can be passed through the heater 4 when it is connected to the battery 5. In systems that use inductive heating, electrical connectivity can be omitted if no parts requiring electrical power are located in the article 30. An inductive work coil/drive coil can be housed in the device 20 and supplied with power from the battery 5, and the article 30 and the device 20 shaped so that when they are connected, there is an appropriate exposure of the heater 4 to flux generated by the coil for the purpose of generating current flow in the material of the heater. The FIG. 1 design is merely an example arrangement, and the various parts and features may be differently distributed between the device 20 and the article 30, and other components and elements may be included. The two sections may connect together end-to-end in a longitudinal configuration as in FIG. 1, or in a different configuration such as a parallel, side-by-side arrangement. The system may or may not be generally cylindrical and/or have a generally longitudinal shape. Either or both sections or components may be intended to be disposed of and replaced when exhausted, or be intended for multiple uses enabled by actions such as refilling the reservoir and recharging the battery. In other examples, the system 10 may be unitary, in that the parts of the device 20 and the article 30 are comprised in a single housing and cannot be separated. Embodiments and examples of the present disclosure are applicable to any of these configurations and other configurations of which the skilled person will be aware.

The present disclosure relates to the refilling of a storage area for aerosol generating material in an aerosol provision system, whereby a user is enabled to conveniently provide a system with fresh aerosol generating material when a previous stored quantity has been used up. It is proposed that this be done automatically, by provision of apparatus which is termed herein a refilling device, refilling unit, refilling station, or simply dock. The refilling device is configured to receive an aerosol provision system, or more conveniently, the article from an aerosol provision system having a storage area which is empty or only partly full, plus a larger reservoir holding aerosol generating material. A fluid communication flow path is established between the larger reservoir and the storage area, and a controller in the refilling device controls a transfer mechanism (or arrangement) operable to move aerosol-generating material along the flow path from the larger reservoir in the refilling device to the storage area. The transfer mechanism can be activated in response to user input of a refill request to the refilling device, or activation may be automatic in response to a particular state or condition of the refilling device detected by the controller. For example, if both an article and a larger reservoir are correctly positioned inside or otherwise coupled to the refilling unit, refilling may be carried out. Once the storage area is replenished with a desired quantity of aerosol generating material (the storage area is filled or a user specified quantity of material has been transferred to the article, for example), the transfer mechanism is deactivated, and transfer ceases. Alternatively, the transfer mechanism may be configured to automatically dispense a fixed quantity of aerosol generating material in response to activation by the controller, such as fixed quantity matching the capacity of the storage area.

Figure 2:
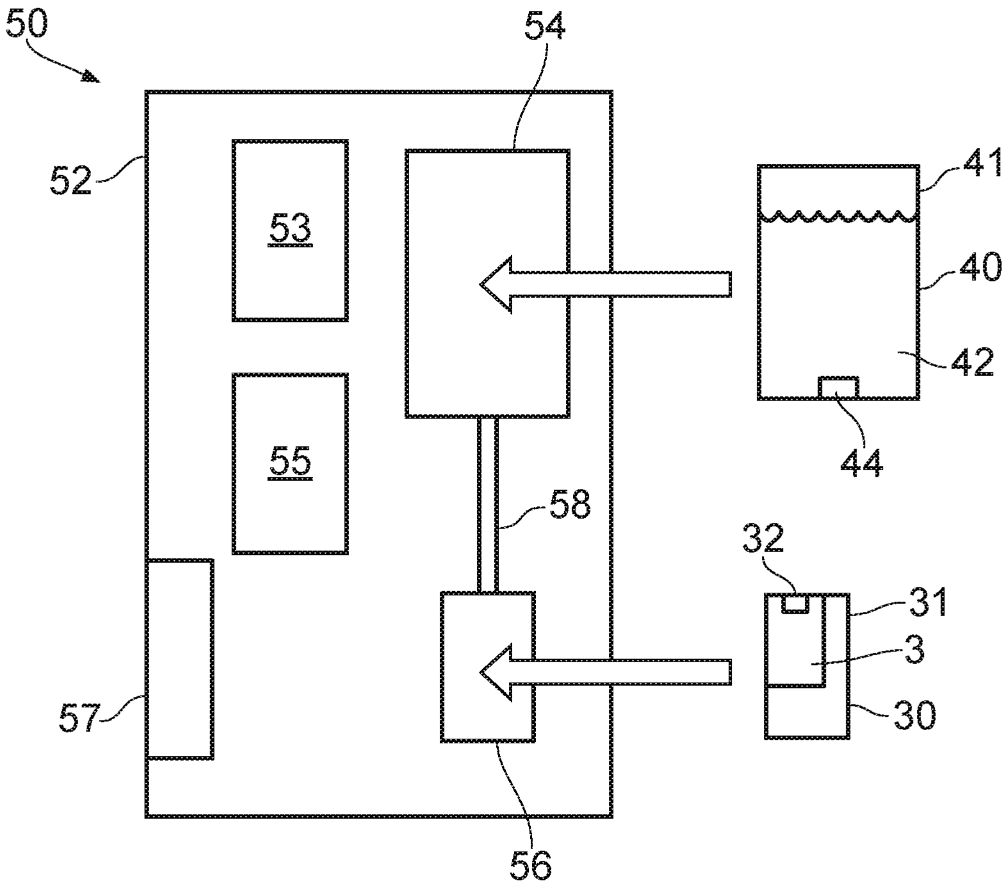
FIG. 2 shows a simplified schematic representation of a refilling device in which embodiments of the present disclosure can be implemented.

FIG. 2 shows a highly schematic representation of an example refilling device. The refilling device is shown in a simplified form only, to illustrate various elements and their relationship to one another. More particular features of one or more of the elements with which the present disclosure is concerned will be described in more detail below.

The refilling device 50 will be referred to hereinafter for convenience as a "dock". This term is applicable since a reservoir and an article are received or "docked" in the refilling device during use. The dock 50 comprises an outer housing 52. The dock 50 is expected to be useful for refilling of articles in the home or workplace (rather than being a portable device or a commercial device, although these options are not excluded). Therefore, the outer housing, made for example from metal, plastics or glass, may be designed to have an pleasing outward appearance such as to make it suitable for permanent and convenient access, such as on a shelf, desk, table or counter. It may be any size suitable for accommodating the various elements described herein, such as having dimensions between about 10 cm and 20 cm, although smaller or larger sizes may be preferred. Inside the housing 50 are defined two cavities or ports 54, 56.

A first port 54 is shaped and dimensioned to receive and interface with a refill reservoir 40. The first or refill reservoir port 54 is configured to enable an interface between the refill reservoir 40 and the dock 50, so might alternatively be termed a refill reservoir interface. Primarily, the refill reservoir interface is for moving aerosol-generating material out of the refill reservoir 40, but as described below, in some cases the interface may enable additional functions, such as electrical contacts and sensing capabilities for communication between the refill reservoir 40 and the dock 50 and determining characteristics and features of the refill reservoir 40.

The refill reservoir 40 comprises a wall or housing 41 that defines a storage space for holding aerosol-generating material 42. The volume of the storage space is large enough to accommodate many or several times the storage area/reservoir 3 of an article 30 intended to be refilled in the dock 50. A user can therefore purchase a filled reservoir 40 of their preferred aerosol generating material (flavor, strength, brand, etc.), and use it to refill an article 30 multiple times. A user could acquire several reservoirs 40 of different aerosol generating materials, so as to have a convenient choice available when refilling an article. The refill reservoir 40 includes an outlet orifice or opening 44 by which the aerosol generating material 42 can pass out of the refill reservoir 40.

A second port 56 is shaped and dimensioned to receive and interface with an article 30. The second or article port 56 is configured to enable an interface between the article 30 and the dock 50, so might alternatively be termed an article interface. Primarily, the article interface is for receiving aerosol-generating material into the article 30, but in some cases the interface may enable additional functions, such as electrical contacts and sensing capabilities for communication between the article 30 and the dock 50 and determining characteristics and features of the reservoir 30.

The article 30 itself comprises a wall or housing 31 that has within it (but possibly not occupying all the space within the wall 31) a storage area 3 for holding aerosol-generating material. The volume of the storage area 3 is many or several times smaller than the volume of the refill reservoir 40, so that the article 30 can be refilled multiple times from a single refill reservoir 40. The article 30 also includes an inlet orifice or opening 32 by which aerosol-generating material can enter the storage area 3. Various other elements may be included with the article 30, as discussed above with regard to FIG. 1.

The housing also accommodates a fluid conduit 58, being a passage or flow path by which the reservoir 40 and the storage area 3 of the article 30 are placed in fluid communication, so that aerosol-generating material can move from the refill reservoir 40 to the article 30 when both the refill reservoir 40 and the article 30 are correctly positioned in the dock 50. Placement of the refill reservoir 40 and the article 30 into the dock 50 locates and engages them such that the fluid conduit 58 is connected between the outlet orifice 44 of the reservoir 40 and the inlet orifice 32 of the article 30. Note that in some examples, all or part of the fluid conduit 58 may be formed by parts of the refill reservoir 40 and the article 30, so that the fluid conduit is created and defined only when the refill reservoir 40 and/or the article 30 are placed in the dock 50. In other cases, the fluid conduit 58 may be a flow path defined within the housing 52 of the dock 50, to each end of which the respective orifices are engaged.

Access to the reservoir port 54 and the article port 56 can be by any convenient means. Apertures may be provided in the housing 52 of the dock 50, through which the refill reservoir 40 and the article 30 can be placed or pushed. The refill reservoir 40 and/or the article 30 may be completely contained within the respective apertures or may partially be contained such that a portion of the refill reservoir 40 and/or the article 30 protrude from the respective ports 54, 56. In some instances, doors or the like may be included to cover the apertures to prevent dust or other contaminants from entering the apertures. When the refill reservoir 40 and/or the article 30 are completely contained in the ports 54, 65, the doors or the like might require to be placed in closed state to allow refilling to take place. Doors, hatches and other hinged coverings, or sliding access elements such as drawers or trays, might include shaped tracks, slots or recesses to receive and hold the refill reservoir 40 or the article 30, which bring the refill reservoir 40 or the article 30 into proper alignment inside the housing 52 when the door, etc. is closed. Alternatively, the housing of the dock 50 may be shaped so as to include recessed portions into which the article 30 or refill reservoir 40 may be inserted. These and other alternatives will be apparent to the skilled person, and do not affect the scope of the present disclosure.

The dock 50 also includes an aerosol generating material transfer mechanism, arrangement, or apparatus 53, operable to move or cause the movement of fluid out of the refill reservoir 40, along the conduit 58 and into the article 30. Various options are contemplated for the transfer mechanism 53, but by way of an example, the transfer mechanism 53 may comprise a fluid pump, such as a peristaltic pump. The peristaltic pump may be arranged to rotate and compress parts of the conduit 58 to force source liquid along the length of the conduit towards the inlet orifice 32 of the article 30 in accordance with the conventional techniques for operating a peristaltic pump.

A controller 55 is also included in the dock 50, which is operable to control components of the dock 50, in particular to generate and send control signals to operate the transfer mechanism 53. As noted, this may be in response to a user input, such as actuation of a button or switch (not shown) on the housing 52, or automatically in response to both the refill reservoir 40 and the article 30 being detected as present inside their respective ports 54, 56. The controller 55 may therefore be in communication with contacts and/or sensors (not shown) at the ports 54, 56 in order to obtain data from the ports and/or the refill reservoir 40 and article 30 that can be used in the generation of control signals for operating the transfer mechanism 53. The controller 55 may comprise a microcontroller, a microprocessor, or any configuration of circuitry, hardware, firmware or software as preferred; various options will be apparent to the skilled person.

Finally, the dock 50 includes a power source 57 to provide electrical power for the controller 53, and any other electrical components that may be included in the dock, such as sensors, user inputs such as switches, buttons or touch panels, and, if present, display elements such as light emitting diodes and/or display screens to convey information about the dock's operation and status to the user. In addition, the transfer mechanism may be electrically powered. Since the dock 50 may be for permanent location in a house or office, the power source 57 may comprise a socket for connection of an electrical mains cable to the dock 50, so that the dock 50 may be "plugged in" to mains electricity. Any suitable electrical converter to convert mains electricity to a suitable operational supply of electricity to the dock 50 may be provided, either on the mains cable or within the dock 50. Alternatively, the power source 57 may comprise one or more batteries, which might be replaceable or rechargeable, and in the latter case the dock 50 may also comprise a socket connection for a charging cable adapted to recharge the battery or batteries while housed in the dock.

As noted above, the fluid conduit 58 is arranged so as to be in fluid communication with the reservoir 40 and the article 30 to allow source liquid to be transferred to the storage area of the article 30. The article 30 is suitably configured to be able to be refilled by the dock 50, e.g., via inlet opening 32. However, the article 30 is arranged so as to, on the one hand, provide a relatively easy engagement between the fluid conduit 58 (or other component(s) linked to the fluid conduit 58) so as to facilitate refilling of the article 30, and on the other hand, is arranged so as to prevent or reduce source liquid exiting the article 30 (for example, when the (full) article 30 is transitioned between the dock 50 and the aerosol provision device after the dock 50 has refilled the article 30 with source liquid). Accordingly, further details regarding the article 30 and the fluid conduit 58 and dock 50 are described herein.

In accordance with aspects of the present disclosure, refilling of the article 30 is achieved via a nozzle configured to pierce a resealable septum of the article 30, whereby the transfer of aerosol-generating material (such as source liquid) from the refill reservoir 40 to the reservoir 3 of the article 30 can be effected by passing aerosol-generating material through a hollow passage of the nozzle, out of a suitable opening of the nozzle and into the reservoir 3. The refilling occurs when the opening of the nozzle is located within the reservoir 3 after having pierced the septum, which is designed to cover an opening to the reservoir 3 of the article 30. When the nozzle is withdrawn from the article, the septum is designed to reseal, thereby preventing aerosol-generating material exiting the reservoir 3 through the septum. Providing a refilling arrangement based on the use of a nozzle and septum provides a simple system for transferring aerosol-generating material. The number of moving parts, particularly within the article, is reduced so wearing or malfunctioning of these parts, which may affect or prevent refilling, is avoided. Moreover, the structural integrity of the septum is maintained over a number of piercings which may be due, in part, to a nozzle having a relatively small diameter. Aerosol-generating material leakage can be avoided by ensuring the refilling only occurs when the nozzle is located within the reservoir 3. Thus, using a septum and nozzle combination for refilling the reservoir 3 of an article 30 provides a simple, easy-to-use, and clean method for automating the refilling of the article 30 with aerosol generating material.

Figure 3:
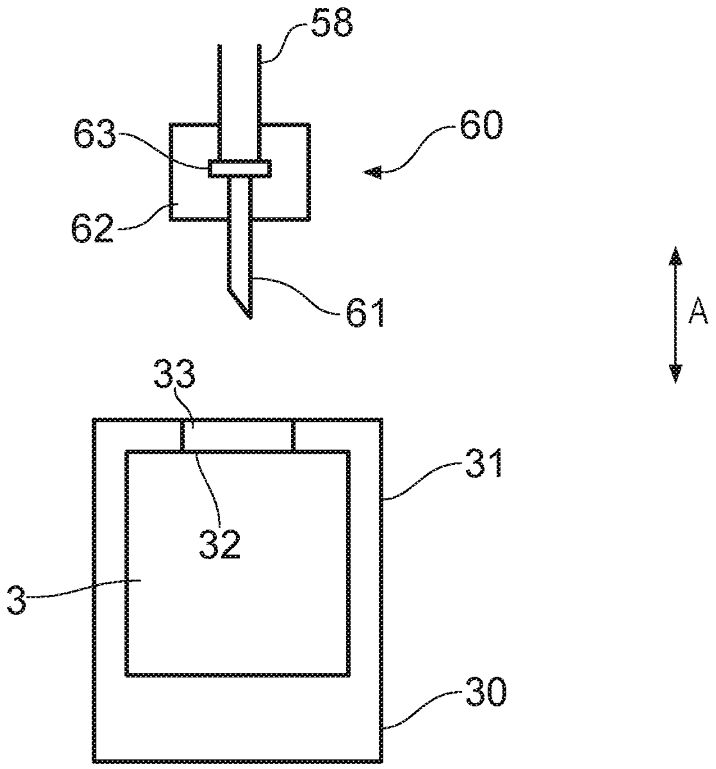
FIG. 3 shows a simplified cross-sectional view of a nozzle arrangement including a nozzle having a piercing element and an article comprising a septum configured to be pierce by the piercing element for effecting refilling of the article according to an example of the disclosure.

FIG. 3 is a highly schematic representation of certain components of FIG. 2 shown in more detail. Certain other aspects of FIG. 2 have been omitted for clarity from FIG. 3. FIG. 3 broadly shows article 30 of FIG. 2 in addition to nozzle arrangement 60 (not shown in FIG. 2). The article 30 includes an article housing 31, an opening 32 providing an opening in the housing 31 to the reservoir 3 provided within the article 30 and a septum 33 covering the opening 32. The nozzle arrangement 60 comprises a nozzle 61 coupled to a nozzle head 62 (which in turn is coupled to the fluid conduit 58) via a coupling element 63.

Turning to the article 30 in more detail, the article 30 in FIG. 3 comprises a valve arrangement which includes a septum 33 arranged to cover the opening 32 of the article 3. The septum 33 is configured to act as a seal that prevents or reduces aerosol-generating material (e.g., source liquid) from exiting the reservoir 3 of the article 30 via the opening 32, but at the same time provides access to the reservoir 3 of the article 30 via a material which is able to be selectively pierced by a piercing element as part of a refilling process. The refilling process is achieved via passing aerosol-generating material (source liquid) from the refill reservoir 40 through a suitable nozzle 61 configured to pierce the septum 33. The material of the septum 33 is also formed from a relatively soft material, such that, when the piercing element/nozzle 61 is removed from the septum 33, the material of the septum 33 naturally closes to reseal (or partially reseal) the hole formed from piercing the septum 33 allowing the article 30 to be handled/coupled to the aerosol provision device 20 without leakage of the aerosol-generating material through the septum 33

In respect of the material used to form the septum 33 of the article, the material should satisfy certain criteria. Firstly, the material should be able to be pierced by a given piercing element (that is, have a certain penetrability). The suitability of a particular material in respect of its penetrability will depend in part on the characteristics of the nozzle/piercing element, such as the size (e.g., diameter) and/or sharpness of the nozzle/piercing element. A property of the material which can be used to help characterise the above is the hardness, or shore hardness, of the material. The shore hardness is a measure of the resistance to indentation that a material has, or the degree to which a material resists deformation under compression. Relatively speaking, softer materials are able to pierced more easily with a given nozzle/piercing element having a certain sharpness. That is, the force required to pierce a softer material with a given piercing element is less than the force required for a relatively harder material. Additionally, softer materials are able to be pierced more easily with relatively blunter piercing elements when applying a fixed force to the septum 33 as compared to septa formed from relatively harder materials. Secondly, because softer materials have less structural rigidity they are more likely to deform when a load is applied to the material prior to piercing, and therefore excess stress can be applied to the joins between the septum 33 and the housing 31 of the article 30. This means the robustness of the septum 33/article 30 when being pierced may decrease. This robustness may be influenced by the size and shape of the opening 32 and/or the size and shape of the septum 33. Thus, the material forming the septum 33 should be soft enough to be able to be pierced by the piercing element/nozzle but hard enough to reduce/limit the stresses at the join(s) between the septum 33 and housing 31 of the article 30 when a load is applied to the septum 33. Thirdly, the material forming the septum 33 should be able to be resalable for a given piercing element. The shore hardness can also be used to characterise the degree to which a material is able to reseal once pierced-materials having a shore hardness value which indicates a relatively softer material will generally be better at resealing than materials having a shore hardness value which indicates a relatively harder material. Additionally, softer materials (e.g., materials which have a softer shore hardness value) may permit relatively larger holes formed by a piercing element with a larger diameter to be resealed when the piercing element is removed as compared to harder materials.

As will be appreciated, the specific material selected for the septum 33 may be chosen in dependence of the particular configuration of the article 30 and nozzle arrangement 60 to be used (or vice versa; that is the configuration of the article 30 and nozzle arrangement 60 may be made on the basis of the material to be used for the septum 33). The skilled person may determine what piercing element or material for the septum 33 to use based on empirical testing, computer modelling, or the like.

Additionally, the material of the septum 33 may also be chosen in dependence on the aerosol-generating material to be stored in the article 30. For example, in the case of a source liquid, the material forming the septum 33 may be provided to substantially prevent the flow of the source liquid through the septum 33, for instance the material may be at least liquid impermeable to the source liquid. Equally, certain materials may react with constituents in the aerosol-generating material (source liquid), and thus be unsuitable for use as the septum material for this reason. Again, depending on the specifics of the source liquid, certain materials may be more or less suitable for a given source liquid and the skilled person will be able to select suitable materials for the septum 33 based on the type/properties of the aerosol-generating material for a given implementations.

In some implementations, the material that may be used for septum 33 is or includes silicone, which may be available or manufactured having a range of different properties (e.g., hardness). Depending on the specific application at hand, the skilled person would be able to select a suitable silicone having a suitable hardness as appropriate, for example, taking into the characteristics above. Other materials which satisfy the above criteria may also be used to form the septum, and it should be appreciated that certain materials may be more suited to specific combinations of piercing elements and aerosol-generating materials than others.

Figure 4A:
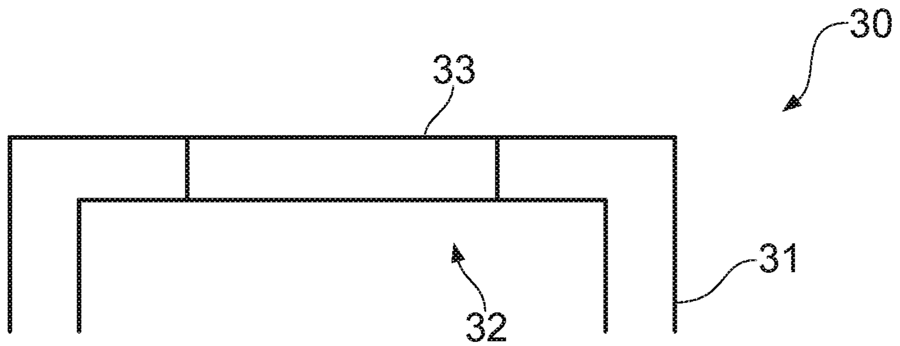
FIGS. 4A and 4B respectively schematically show two different arrangements for the septum of FIG. 3 relative to the housing of article.
Figure 4B:
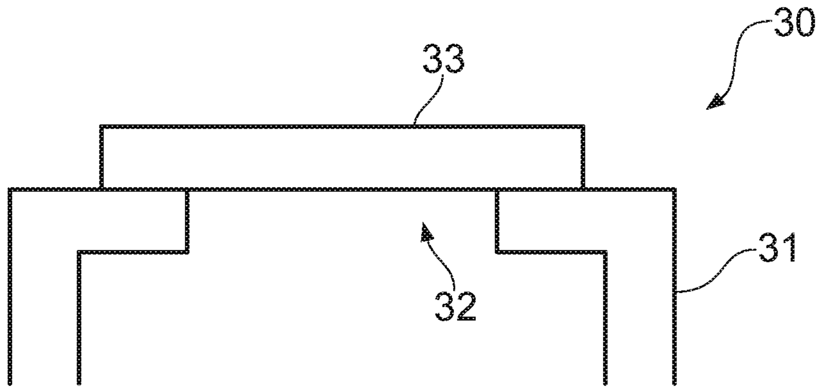

As stated above, the septum 33 is arranged to cover the opening 32 of the article 30 where the opening 32 is formed in the housing 31 of the article 30 and provides access to the storage area 3 of the article 30. FIGS. 4A and 4B show two, highly schematic different configurations of the septum 33 covering the opening 32 in cross-section.

In FIG. 4A, the septum 33 is provided such that the septum 33 is positioned within the opening 32 and extends from one side of the opening 32 (formed by one side of the housing 31 in FIG. 4A) to the other side of the opening 32 (formed by the other side of the housing 31 in FIG. 4A). That is to say, the outer edge of the septum 33 abuts the inner edge of the housing 31 of the article 30 forming the opening 32. The opening 32 may be any suitable shape, but in the present example the opening 32 is a circular opening 32. A circle or circular shape may be advantageous as any stresses applied to the septum 33 (e.g., from the piercing element pressing down on the outer surface of the septum 33) are more likely to be evenly distributed across the whole of the septum 33 and reduce any localised pressure points at the edge(s) between the septum 33 and housing 31. This may improve the robustness of the above configuration and help to prevent separation of the septum 33 from the housing 31. The septum 33 is correspondingly formed to have a broadly similar circular shape and is arranged such that the outer edge of the septum 33 abuts the inner wall of the circular opening 32 as discussed above. The septum may be press-fitted into the opening 32 or may be adhered, e.g., via adhesive or welding (e.g., ultrasonic welding), to the housing 31 of the article 30. When the aerosol-generating material to be stored in the article 30 is a liquid, such as the source liquid, then the septum 33 may be attached to the housing 31 so as to form at least a liquid tight seal between the outer edge of the septum 33 and the edge of the opening 32 based on the properties of the source liquid contained or to be contained in the article 30.

In FIG. 4B, the septum 33 is provided externally to the article 30. The septum 33 may be any suitable shape but in this example is larger than the opening 32. For example, if the opening 32 is circular, the septum 33 may also be circular but have a larger radius than the opening 32. The shape of the septum 33 does not need to match the shape of the opening 32 in this configuration, but it may reduce material usage if the shape of the septum 33 is similar to that of the opening 32. For similar reasons as above, the opening 32 may be circular. The septum 33 is positioned such that it covers the opening 32 and also overlaps with the edge of the housing 31 defining the opening 32. The parts of the septum 33 that overlap the housing 31 may be used to attach the septum 33 to the housing 31 of the article 30, e.g., via adhesive or welding. When the aerosol-generating material to be stored in the article 30 is a liquid, such as the source liquid, then the septum 33 may be attached to the housing 31 so as to form at least a liquid tight seal. Although not shown, in other implementations, the septum 33 may be attached to the internal side of the reservoir 3 of the article 30 (that is, the septum 33 may be positioned on the underside of the housing 31 of FIG. 4B). However, such implementations may be more complex to manufacture. The general size and/or thickness of the septum 33 may be similar to the septum 33 described in FIG. 4A.

Thus, in either situation, the septum 33 is provided to extend across the opening 32 formed in the article 30 and more specifically at least between the edge(s) of the opening 32 such that the opening is fully covered by the septum 33. Accordingly, access to the reservoir 3 via the opening 32 is achieved by passing through the septum 33. The size of the septum 33 and correspondingly the opening 32 are not particularly limited, but generally will be larger than the diameter of the nozzle 61 and smaller than the width of the article 30. By way of an example only, the septum 33 may have a diameter (or largest dimension if not circular) on the order of 5 to 30 mm, although other sizes for the septum 33 may be used in other implementations. Equally, the thickness of the septum 33 can be any suitable thickness, and may be the same, smaller, or greater than the thickness of the housing 31 at the opening 32. By way of example only however, the septum may be on the order of a few mm thick, for example, 1 to 5 mm thick, although the septum may have a different thickness in other implementations. The dimensions of the septum 33 may vary based on the dimensions/characteristics of the nozzle 61 and the type of material used to form the septum 33.

With reference back to FIG. 3, the dock 50 comprises the nozzle arrangement 60. As seen in FIG. 3, the nozzle arrangement couples to an end of fluid conduit 58 (the other end of fluid conduit 58 couples to the refill reservoir 40 as discussed above). The nozzle arrangement 60 comprises a nozzle 61, a nozzle head 62, and a coupling element 63. The nozzle head 62 provides the body of the nozzle arrangement 60, with the fluid conduit 58 and nozzle 61 provided to the nozzle head 62. The coupling element 63 in FIG. 3 couples the fluid conduit 58 to the nozzle 61.

Figure 5:
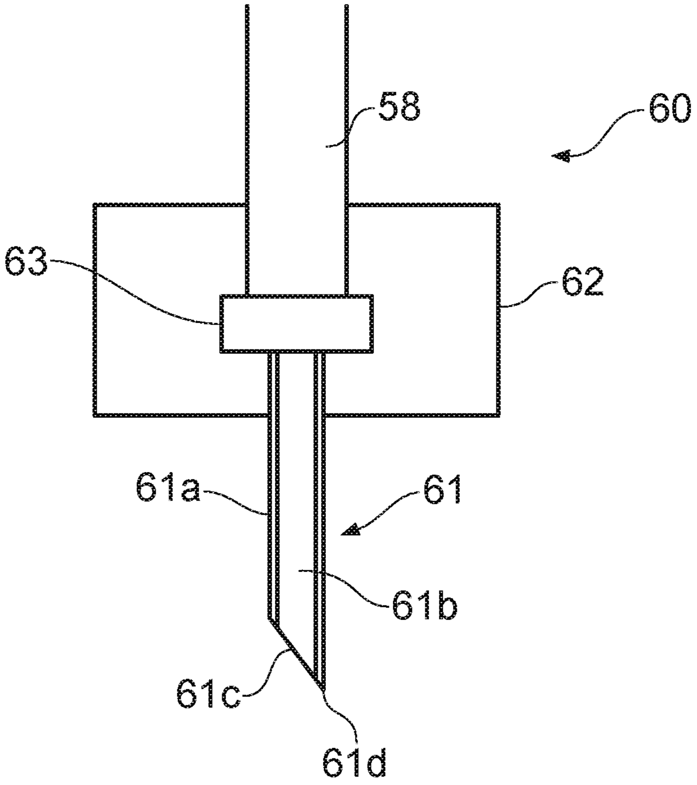
FIG. 5 shows a simplified cross-sectional view of the nozzle arrangement of FIG. 3 in more detail in accordance with aspects of the present disclosure.

FIG. 5 schematically shows a cross-section of the nozzle arrangement 60 (and more specifically the nozzle 61) of FIG. 3 in more detail. The nozzle 61 has an approximate tubular structure and has a proximal end coupled to the coupling element 63 and a distal end opposite the proximal end. The distal end of the nozzle 61 protrudes from the nozzle head 62 when the nozzle 61 is coupled to the nozzle head 62/coupling element 63. The nozzle 61 comprises an outer wall 61*a*, which may be formed from any suitable material, such as metal or plastic. The outer wall 61*a* defines a hollow passage 61*b* which is designed such that source liquid (or more generally, aerosol-generating material) is able to flow from the proximal end to the distal end of the nozzle 61 and out of the nozzle 61 via opening or outlet 61*c*. Accordingly, the diameter of the passage 61*b* and the opening 61*c* are set to enable source liquid to move along the passage 61*b* and out of the opening 61*c* under influence of the transfer mechanism 53. The specific size/diameter of the passage 61*b* and/or opening 61*c* may be chosen based on the parameters of the transfer mechanism 53 and the properties of the source liquid to be transferred to achieve a certain flow/mass transfer rate, etc. For instance, more viscous source liquids are likely to be more difficult to move via a pump, so a more powerful pump and/or a larger diameter passage 61*b* and/or opening 61*c* may be provided to achieve a similar mass transfer rate as compared to a less viscous source liquid. By way of an example only, in the case of transferring e-liquid, the nozzle 61 may be approximately 5 to 50 mm long (from the nozzle head 62), have a diameter of around 0.5 to 5.0 mm, and a passage 61*b* of diameter around 0.2 to 4.8 mm. As above, however, the nozzle 61 may be sized differently in different implementations.

Source liquid is provided to the proximal end of the nozzle 61 (or more specifically, to the hollow passage 61*b* of the nozzle 61) from the fluid conduit 58 (and thus from the refill reservoir 40) when the transfer mechanism 53 is actuated. The nozzle 61 may be referred to herein as a source liquid delivery nozzle 61 (or more generally an aerosol-generating material delivery nozzle), the passage 61*b* may be referred to herein as a source liquid pathway (or more generally an aerosol-generating material pathway), and the opening or outlet 61*c* may be referred to as a source liquid opening or outlet 61*c* (or more generally, aerosol-generating material opening or outlet).

The distal end of the nozzle 61 further comprises a piercing element 61*d* configured so as to pierce the septum 33 of the article 30. The piercing element 61*d* may be configured in any suitable way so as to be able to pierce the septum 33 of the article 30. In the example of FIG. 5, the distal end of the nozzle 61 is shaped such that the end tapers to a point or sharp edge (shown by numeral 61*d*). The taper may be along one or multiple directions to achieve a suitable sharp edge or point that allows the piercing element 61*d* to be able to pierce the septum 33. For example, in one implementation, the end of the tubular housing 61*a* is cut along the line shown in FIG. 5 to form a suitable sharp edge. In alternative implementations, the nozzle 61 may be formed so as to have a shape resembling a needle as the piercing element 61*d*. Forming the nozzle 61 and piercing element 61*d* as a single component may facilitate easier manufacture.

In other implementations, the piercing element 61*d* may be separately formed and subsequently attached to the tubular housing 61*a*, e.g., via a suitable welding process. In yet other implementations, the piercing element 61*d* may be entirely separate from the nozzle 61 and supported instead by the nozzle head 62 (for example, a needle like protrusion extending from the nozzle head 62 to the distal end of the nozzle 61. The specific form of the piercing element 61*d* is not significant to the principles of the present disclosure, and any suitable piercing element which is capable of piercing the septum in question may be employed by the skilled person. As discussed above, the piercing element 61*d* may be configured to suitably pierce a given material The coupling element 63 is shown schematically in FIG. 4. The coupling element 63 may be any suitable coupling element providing any desired fluid connection between the fluid conduit 58 and the nozzle 61. The coupling element 63 may be a clamp or the like, where the fluid conduit 58 and/or nozzle 61 comprise flanges that are clamped into position by the coupling element 63. The coupling element 63 may instead comprise a screw-thread where the respective ends of the nozzle 61 and fluid conduit 58 comprise corresponding threads that allow the nozzle 61 and fluid conduit 58 to be screwed into the nozzle head 62. Any suitable connection mechanism may be employed in accordance with the implementation at hand. The coupling element 63 may also comprise suitable sealing elements (not shown) such as O-rings to provide, e.g., a fluid tight seal when either or both of the fluid conduit 58 and nozzle 61 are coupled to the nozzle head 62. While it is shown that the coupling element 63 is position inside the nozzle head 62, in other implementations, respective coupling elements 63 may be provided for each of the fluid conduit 58 and nozzle 61, e.g., on the surface of the nozzle head 62, whereby the nozzle head 62 comprises an internal pathway coupling the respective coupling elements 63.

Providing the nozzle 61 and/or fluid conduit 58 such that they may decouple from the nozzle head 62 may offer the advantage of improved, or ease of, maintenance. For instance, the nozzle 61 which is intended to pierce the septum of the article 30 may become damaged or worn with repeated use of the nozzle 61 and thus the nozzle 61 may be changed for another without replacing the entire dock 50. However, in some implementations, the nozzle 61 and fluid conduit 58 may be integrally formed (that is, the fluid conduit 58 may comprise the nozzle 61). In these implementations, the nozzle 61/fluid conduit 58 is arranged to mechanically couple to the nozzle head 62 and considerations around fluidly coupling the nozzle 61 and fluid conduit 58 are not required. This may lead to a reduced chance of leakage of source liquid between the fluid conduit 58 and the nozzle, for example.

With reference back to FIG. 3, the dock 50 is configured such that, during use, the nozzle arrangement 60 and the article 30 are able to be moved relative to one another in the direction indicated by the double-headed arrow labelled A.

In some implementations, the nozzle head 62 may be coupled to a suitable movement mechanism (not shown in FIG. 3), which is able to translate the nozzle head 62 (and hence nozzle 61) towards and away from the article 30 located in the article port 56 of the dock 50 under suitable control by the controller 55 of the dock 50. For instance, when the article 30 is not engaged with the article port 56, the nozzle head 62 may be located in a first position in which the nozzle 61 is kept away from the article port 56 (for example, the nozzle head 62 may be retracted in the dock 50). When the article 30 is located in the article port 56 and when the controller 55 determines it is appropriate to refill the article 30 (e.g., either automatically based on the presence of the article 30 in the article port 56 or based on receiving a suitable instruction from the user of the dock 50), the controller 55 causes the nozzle head 62 to move towards the article 30 in the article port 56 via the movement mechanism. More specifically, the nozzle head 62 is moved towards the article 30 such that the nozzle 61 is moved towards the septum 33 of the article 30. The movement mechanism continues to move the nozzle head 62 toward the article 30 such that the nozzle 61 contacts the article 30 and, under application of suitable force, proceeds to pierce the septum 33 using the piercing element 61*d* of the nozzle 61. The movement mechanism may continue to move the nozzle head 62 toward the article 30 such that the opening 61*c* of the nozzle 61 is appropriately located within the reservoir 3 of the article 30. More particularly, the opening 61*c* is provided in a position such that the septum 33 is between the opening 61*c* and the nozzle head 62. When the nozzle head 62 is positioned as above, this is referred to as a second position of the nozzle head 62. The movement mechanism is controlled to stop movement when the nozzle head 62 is located in the second position. In alternative implementations, another part of the nozzle arrangement 60 may be controlled to move relative to the article 30. For example, the nozzle 61 may be provided such that it extends from or retracts into the nozzle head 62. Thus, more broadly, the nozzle arrangement 60 is controlled to move between a first position in which the opening 61*c* of the nozzle arrangement 60 is located outside of the article 30 and a second position in which the piercing element 61*d* is configured to pierce the septum 33 of the article 30 located in the article port 56 such that the opening 61*c* is located inside the article 30.

Additionally, or alternatively, the article port 56 may be configured with a suitable movement mechanism to cause the article port 56 (and article 30 when installed in the article port 56) to move towards the nozzle arrangement 60 and nozzle 61. The same principles apply in these alternative implementations. Thus, in alternative implementations, the article 30 is generally controlled, via the article port 56, to move between a first position in which the aerosol-opening 61*c* of the nozzle arrangement 60 is located outside of the article 30 and a second position in which the piercing element 61*d* is configured to pierce the septum 33 of the article 30 located in the article port 56 such that the opening 61*c* is located inside the article 30.

In more general terms, the dock 50 is configured to cause relative movement of the nozzle arrangement and/or article between the first position and the second position.

Figure 6:
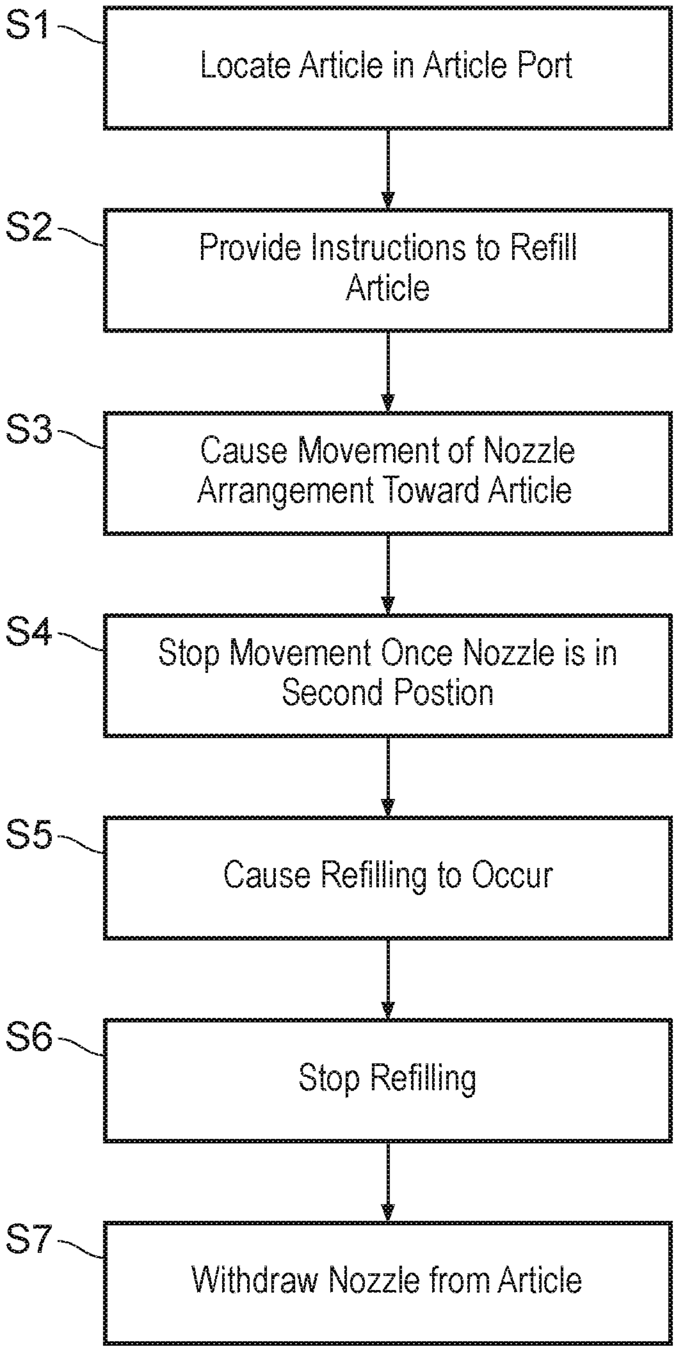
FIG. 6 shows an example method for refilling an article using the nozzle arrangement of FIG. 3 according to aspects of the present disclosure.

The operation of the dock 50 for refilling the article 30 will now be explained. FIG. 6 shows an example method for aiding to explain the principles of operation of the dock 50 to cause refilling of an article 30.

The method starts at step S1 where the article 30 is engaged with the article port 56. As described above, this may include the article 30 being coupled to the article port 56 or may include the device 20 including the article 30 both being coupled to the article port 56.

Once at least the article 30 is engaged with the article port 56, at step S2, the controller 55 receives instructions to refill the article 30. As described above, these instructions may be received by the controller 55 either as a result of a user input, e.g., obtained via a user input mechanism such as a button on the dock 50 or via a remote device communicate coupled to the dock 50 (e.g., a smartphone), or automatically as a result of the dock 50 determining that the article 30 is appropriately coupled to the article port 56.

Optionally, and although not shown, there may be an additional step before, after or during step S2, which may include the controller 55 determining whether refilling is required, e.g., if the article 30 is already considered to have a sufficient amount of aerosol-generating material therein, then the controller 55 may determine that refilling is not required. The controller 55 may make this determination based on measuring or otherwise being informed of the amount of aerosol-generating material in the article 30. If refilling is not required, then the controller 55 may cause a suitable indication to be provided to the user.

In response to receiving the instructions at step S2, the controller 55 of the dock 50 is configured to cause relative movement of the nozzle arrangement toward the article 30 at step S3. As described above, the mechanism for causing relative movement is not particularly limited, but in all cases provides relative movement of the nozzle 61 towards the septum 33 from a first position in which the opening 61*c* of the nozzle arrangement 60 is located outside of the article 30 and a second position in which the piercing element 61*d* is configured to pierce the septum 33 of the article 30 located in the article port 56 such that the opening 61*c* is subsequently located inside the article 30.

Once the opening 61*c* of the nozzle 61 is located in the second position, the controller 55 is configured to stop relative movement of the nozzle arrangement 60 toward the article 30 at step S4. More particularly, the controller 55 is configured to cause the nozzle arrangement and/or article to be maintained in the second position for at least the duration of the refilling operation, thereby ensuring that aerosol-generating material exiting the nozzle 61 via the opening 61*c* is passed to the reservoir 3 of the article 30 thereby reducing the chance of inadvertently depositing aerosol-generating material in a location other than the reservoir 3. That is, the dock 50 is controlled to position the nozzle arrangement 60 relative to the article port 56 in the second position when the transfer mechanism 53 is controlled to transfer aerosol-generating material from the refill reservoir 40.

Once relative movement has stopped at step S4, the controller 55 is configured to cause the transfer mechanism 53 to start transfer of the aerosol generating material, e.g., source liquid, from the refill reservoir 40 to the reservoir 3 of the article 30 at step S5. More specifically, once the transfer mechanism 53 is operated, source liquid is transferred (e.g., pumped) from the refill reservoir 40 along the conduit 58 via the transfer (e.g., pumping) action of the transfer mechanism 53. The source liquid travels along the conduit 58, to the connecting element 63 of the nozzle arrangement 60, through passage 61*b* of the nozzle 61 and out of opening 61*c* of the nozzle 61 into the reservoir 3 of the article 30. As discussed above, the transfer mechanism 53 and/or diameter of the passage 61*b* and/or diameter of the opening 61*c* may be chosen to meet certain criteria, such as to meet a specific mass transfer rate.

At step S6, the controller 55 is configured to determine when refilling has completed and subsequently cause the transfer mechanism 53 to stop transferring aerosol-generating material to the reservoir 3 of the article 30. As discussed previously, this may include measuring a parameter of the article 30 which is indicative of the amount of aerosol-generating material, for example, a capacitance or the like using a suitable sensor, or by determining that a predetermined amount of aerosol-generating material has been transferred to the reservoir 3 of the article 30.

Once refilling has been stopped at step S6, the controller 55 causes the nozzle 61 to be withdrawn from the article 30. This is performed by relatively moving the nozzle arrangement 60 and the article 30 away from one another (along the direction A of FIG. 3). Again, this may be performed by moving the nozzle arrangement while keeping the article static, by moving the article while keeping the nozzle arrangement static, or by moving both the nozzle arrangement and article. Step S7 may be performed after or simultaneously with step S6, although this may depend on the properties of the material being transferred by the dock 50. For instance, there may be a delay between steps S6 and S7 to allow for any residual aerosol-generating material held in the nozzle 61 when the transfer mechanism 53 has stopped to pass into the reservoir 3, if this is found to occur for certain aerosol-generating materials.

As the nozzle 61 is withdrawn from the article 30 at step S7, the hole in the septum 33 generated by the piercing element 61*d* piercing the septum 33 as the nozzle 61 is relatively moved towards the septum 33 closes up by virtue of the flexibility of the material used to form the septum 33. As discussed, the hole closes up such that the septum 33 effectively becomes sealed once again, thereby preventing any aerosol-generating material (e.g., source liquid) from passing out of the article 30 via the septum 33. Thus, the septum 33 is formed of a material which allows the septum 33 to be resealed. Hence, when the piercing element 61*d*/nozzle 61 is removed from the article 30, aerosol-generating material is unable to exit the article 30 via the septum 33 and thus the article 30 is able to be removed from the article port 56 and handled without fear of aerosol-generating material leaking through the septum 33. The range of suitable materials for the septum 33 may depend on the size of the hole that is generated by the piercing element 61*d* as discussed above.

At either of steps S6 and S7, the controller 55 may be configured to cause an indication to be provided to a user signifying that refilling is complete and/or that the nozzle arrangement 60 and article 30 have been successfully decoupled (that is, are returned from the second position to the first position). The indication may be provided through a suitable mechanism on the dock 50 (such as an LED or other suitable indicator) or through a remote device communicatively coupled to the dock 50 (such as a smartphone). Once the indicator has been provided to the user, the user may decide to remove the article 30 from the article port 56 and is then free to use the article 30 with the device 20 for the purposes of generating aerosol for inhalation.

In accordance with an aspect of the present disclosure, the nozzle arrangement 60 is further configured to allow fluid (such as air) to exit or escape the reservoir 3 of the article 30 when the nozzle 61 is operated to transfer aerosol-generating material (e.g., source liquid) to the reservoir 3 of the article 30. In this regard, when the transfer mechanism 53 is operated to transfer aerosol-generating material to the reservoir 3 of the article 30, additional material (having a certain volume) is provided to the reservoir 3 which, typically, may have a predefined volume. In the event that air, for example, is unable to escape from the reservoir 3 (or is unable to escape at a rate that is equal to or greater than the rate of mass transfer of the aerosol-generating material into the reservoir 3), then the amount of material within the reservoir 3 subsequently increases during refilling. This subsequently increases the pressure in the reservoir 3 which may cause unwanted effects, such as but not limited to, leakage of aerosol-generating material between various joins/components of the article 30 that otherwise aerosol-generating material would be unable to pass through, increased stress on any sealing components within the article

30, and/or increased stress on components of the nozzle arrangement 60 or transfer mechanism 53.

Thus, the nozzle arrangement 60 in accordance with the present disclosure includes a mechanism to allow air (or any other fluid) to exit the reservoir 3 during refilling of the reservoir 3 with aerosol-generating material.

Figure 7A:
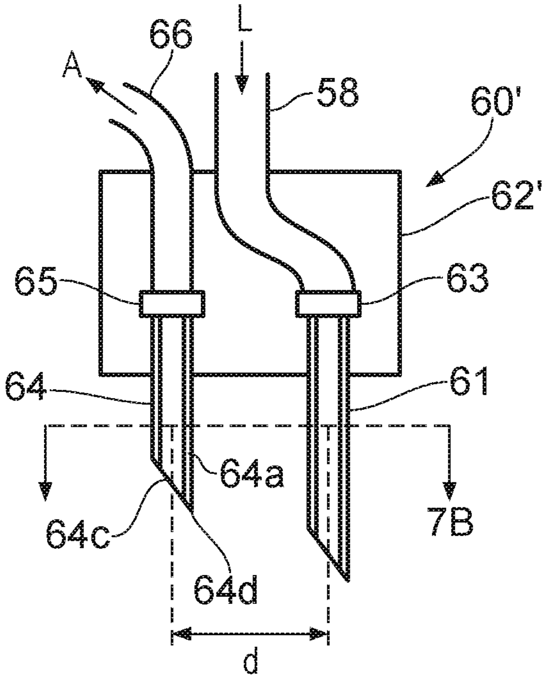
FIGS. 7A and 7B schematically show a side-on cross-sectional view and a bottom-up cross-sectional view of a first example of a nozzle arrangement configured to allow air to exit the reservoir of an article during the refilling process according to aspects of the present disclosure.
Figure 7B:
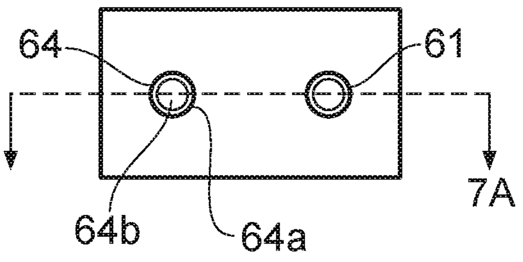

FIG. 7 schematically illustrates one example of a nozzle arrangement 60' configured to allow fluid (such as air) to exit or escape the reservoir 3 of the article 30 when the nozzle 61 is operated to transfer aerosol-generating material (e.g., source liquid) to the reservoir 3 of the article 30. FIG. 7 includes FIG. 7A which schematically shows the nozzle arrangement 60' in a side-on cross-sectional view, and FIG. 7B which schematically shows the nozzle arrangement 60' in a cross-sectional view as viewed from the underside of the nozzle arrangement 60'.

The nozzle arrangement 60' includes nozzle 61, nozzle head 62', coupling element 63, fluid transfer nozzle 64, second coupling element 65 and fluid conduit 66. Also shown in FIG. 7 is fluid conduit 58.

The nozzle 61, coupling element 63 and fluid conduit 58 are substantially the same as those described above in FIG. 5, and a detail description of these components is omitted here.

Nozzle head 62' is predominately the same as nozzle head 62 described in FIG. 5 but, as seen in FIG. 7, the coupling element 63 is shifted off-center (and to the right of FIG. 7). Shifting the coupling element off-center also shifts the nozzle 61, coupled to coupling element 63, off-center as is also shown in FIG. 7. As discussed in respect of nozzle head 62 in FIG. 5, the coupling element 63 may be internal to the nozzle head 62' or coupling elements 63 may be provided on external surfaces of the nozzle head 62' and fluidly coupled together via an internal passageway through the nozzle head 62'.

In addition, the nozzle head 62' includes a second coupling element 65 located in the nozzle head 62'. The second coupling element 65 is substantially similar to coupling element 63 but is configured to allow coupling of the fluid transfer nozzle 64 and, in the shown implementation, fluid conduit 66 to the nozzle head 62'. The second coupling element 65 is substantially similar to the coupling element 63, and comprises any suitable coupling element that provides a fluid connection between the fluid conduit 66 and the fluid transfer nozzle 64. As with coupling element 63, while second coupling element 65 is shown inside the nozzle head 62', in other implementations, respective coupling elements 65 may be provided for each of the fluid conduit 66 and nozzle 64, e.g., on the surface of the nozzle head 62', whereby the nozzle head 62 comprises an internal pathway fluidly coupling the respective coupling elements 65. However, it should be appreciated that whatever the configuration of the second coupling element(s) 65, the fluid transfer nozzle 64 and fluid conduit 66 are fluidly coupled together independently of the nozzle 61 and conduit 58 (that is, the fluid channels connecting the respective nozzles and conduits are separate from one another). Further, it should also be appreciated that, as with conduit 58 and nozzle 61, the fluid conduit 66 and fluid transfer nozzle 64 may be integrally formed.

As with nozzle 61, fluid transfer nozzle 64 has an approximate tubular structure and has a proximal end coupled to the second coupling element 65 and a distal end opposite the proximal end. The distal end of the fluid transfer nozzle 64 protrudes from the nozzle head 62' when the fluid transfer nozzle 64 is coupled to the nozzle head 62'/second coupling element 65. The fluid transfer nozzle 64 comprises an outer wall 64*a*, which may be formed from any suitable material, such as metal or plastic, and which defines a hollow passage 64*b* (or more generally a fluid pathway). The hollow passage 64*b* is designed such that air (or other fluid) is able to flow from the reservoir 3 into the hollow passage 64*b* via a fluid opening 64*c* positioned at the distal end of the fluid transfer nozzle 64. The distal end of the fluid transfer nozzle 64 further comprises a piercing element 64*d* configured so as to pierce the septum 33 of the article 30. The piercing element 64*d* may be configured in any suitable way as described above with respect to piercing element 61*d*.

The fluid conduit 66 is provided as a conduit for fluid (such as air) from the reservoir 3 to be passed along the hollow passage 64*b* of the fluid transfer nozzle 64 to a suitable location for storage/expulsion. In the case of air, the conduit 66 may lead to an opening in the housing of the dock 50. The fluid conduit 66 may be formed of any suitable material, such as plastic, and be formed in a tubular shape. It should be appreciated however that while fluid conduit 66 is shown in FIG. 7A, in other implementations fluid conduit 66 may be omitted, particularly where the fluid that is evacuated from the reservoir 3 is air. That is, the end of the connector element 65 not coupled to the nozzle 64 may be open to the environment/inner space of the dock 50, where in the latter case, the fluid (air) may escape through any gaps in the housing of the dock 50.

Hence, the nozzle head 62' in accordance with the present implementations comprises two, separate and distinct nozzles. The first nozzle, aerosol-generating material transfer nozzle 61, is designed to facilitate the transfer of aerosol-generating material from the refill reservoir 40 to the reservoir 3 of the article 30 via the aerosol-generating material transfer passage 61*b* as described above, while the second nozzle, fluid transfer nozzle 64, is designed to facilitate the transfer of fluid (e.g., air) out of the reservoir 3 as a result of the refilling operation. Both nozzles 61 and 64 have a similar construction—an outer wall 61*a*, 64*a* defining a passageway 61*b*, 64*b* for the transfer of aerosol-generating material and air/fluid respectively via openings 61*c*, 64*c* coupled to the respective passageway 61*b*, 64*c*. Both nozzles 61 and 64 also comprise a respective piercing element 61*d*, 64*d*, each of which is configured to pierce septum 33 of the article 30. However, while the nozzles 61 and 64 are similar in construction, it should be appreciated that the nozzles 61 and 64 may not necessarily be identical. For instance, the passageways 61*b* and 64*b* and associated openings 61*c* and 64*c* may have different sizes (diameters), and/or shapes or cross-sections. Equally, the piercing elements 61*d* and 64*d* may be constructed differently each with a different sharpness, which may be influenced by the diameter of the nozzle 61 and 64 (as discussed, a smaller diameter nozzle may achieve piercing of the same septum material with a relatively blunter piercing element).

The nozzles 61 and 64 are coupled to the nozzle head 62' in a suitable manner as described above (either to an internal coupling element 63, 65 within the nozzle head 62', or external coupling elements 63, 65 on the outer surface of the nozzle head 62'). The nozzle 61 is coupled to fluid conduit 58 which receives source liquid from the refill reservoir 40 via transfer mechanism 53 (as indicated by arrow L on FIG. 7A), while the nozzle 64 is coupled to fluid conduit 66 which is configured to transport fluid (air) out of the reservoir 3 during refilling of the reservoir 3. Accordingly, the nozzle arrangement 60' is configured to both supply aerosol-generating material to the reservoir 3 and allow gas/liquid to escape the reservoir 3 during the refilling process.

Although, the nozzles 61 and 64 are shown essentially being equidistant from the center of the nozzle head 62' in FIGS. 7A and 7B, it should be appreciated that the nozzles 61 and 64 may be provided in any suitable configuration. For example, nozzle 61 may be provided centrally relative to the nozzle head 62', whereas nozzle 64 may be provided off-center. The specific arrangement may depend on the structural arrangement of the dock 50 the arrangement of the nozzle head and conduits in the dock 50.

The nozzles 61 and 64 are provided separate from one another and are separated by a distance d (see FIG. 7A in particular). As described above, each of the nozzles 61 and 64 are designed to pierce a septum 33 of the article 30 and, therefore, each of the nozzles 61 and 64 pierce the article 30 at two locations separated by a distance d corresponding to the separation distance d between the two distinct nozzles 61 and 64. As discussed above in respect of FIGS. 3 to 6, the nozzle head 62' is configured to relatively move with respect to an article 30 in the article port 56 (either by the nozzle head 62' moving relative to a static article 30, an article 30 moving relative to a static nozzle head 62' or both the article 30 and nozzle head 62' moving relative to one another). Accordingly, in the shown implementation, both the aerosol-generating material transfer nozzle 61 and the fluid transfer nozzle 64 protrude from (or extend) the nozzle head 62' in, or substantially in, the same direction. The relative movement of the nozzle head 62' and/or article 30 in the direction along the extent of the nozzles 61, 64 ensures that both nozzles can pierce the septum when the movement is in a single direction.

Due to the dual nozzles of the nozzle arrangement 60', the article 30 may be configured accordingly to allow both nozzles 61 and 64 to be able to pierce the article 30 such that the openings 61*c* and 64*c* of the respective nozzles 61 and 64 may be positioned (and held) within the reservoir 3 of the article 30 during a refilling operation (that is, in the second position described previously).

FIG. 8 shows two example configurations of articles suitable for use with the dual nozzle arrangement 60' described above.

Figure 8A:
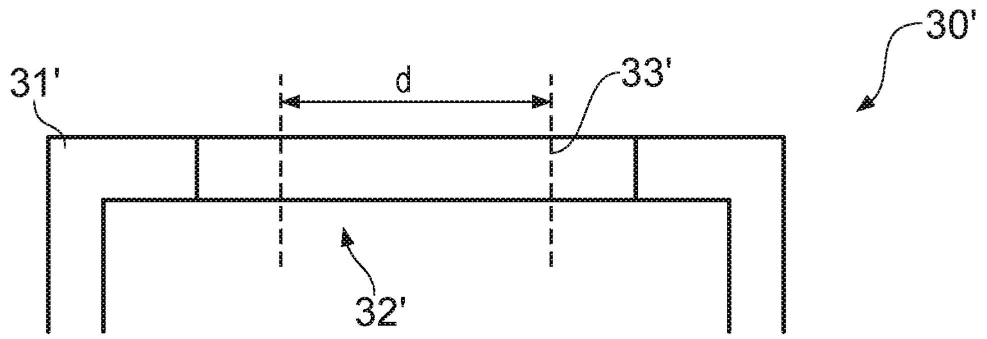
FIGS. 8A and 8B schematically show two examples of articles arranged to be pierced using the nozzle arrangement of FIGS. 7A and 7B, and more specifically

FIG. 8A schematically shows a first article 30' viewed in cross-section. Only the upper part of the article 30' is shown in FIG. 8A. The article 30' is substantially the same as article 30 described in FIG. 3, and only the differences with respect to article 30 are described herein.

The housing 31' of the article 30' differs from housing 31 of article 30 in that the opening 32' formed in the housing 31' has a dimension that is at least greater than the separation distance d between the two nozzles 61 and 64 of the nozzle arrangement 60'. As seen in FIG. 8A, the separation distance d is shown schematically by dashed lines running vertically and the opening 32' is clearly shown as having an extent greater than the separation distance d. In implementations where the opening 32' is a circular opening 32', the opening 32' has a diameter greater than the separation distance d; however, for openings having a different shape, such as a square shape, at least one dimension needs to be greater than the separation distance d. Additionally, as shown in FIG. 8A, the septum 33' is provided in the opening 32' such that the edges of the septum 33' abut the edges of the opening 32' (as discussed in relation to FIG. 4A). The septum 33' may be substantially the same as septum 33 discussed previously, although have different dimensions and may be formed from a different material—for example, a material with a greater rigidity may be used to reduce the septum 33' sagging under its own weight in the middle region of the septum 33'.

In use, when the nozzle arrangement 60' and the article 30' are relatively moved towards one another, each of the nozzles 61 and 64 pierce the septum 33' at different locations (e.g., at the locations indicated by the dashed lines in FIG. 8A). The actual dimension of the septum 33' may be set such that there is a gap between the edge of the septum 33' and the point at which the nozzle 61 or 64 pierces the septum 33', which may help reduce the chances of damaging or weakening the connection between the septum 33' and the opening by ensuring the stress forces caused by the nozzle are not localised at the edge of the septum 33'. When both the opening 61*c* of the nozzle 61 and the opening 64*c* of the nozzle 64 are located within the reservoir 3, having respectively pierced the septum 33', the nozzle arrangement 60' is said to be in the second position and refilling can occur (as at step S4 and S5 of FIG. 6). Broadly speaking, the article 30' of FIG. 8A provides an example of a septum 33' being arranged such that the septum 33' may be pierced at multiple locations (e.g., two locations) simultaneously.

Figure 8B:
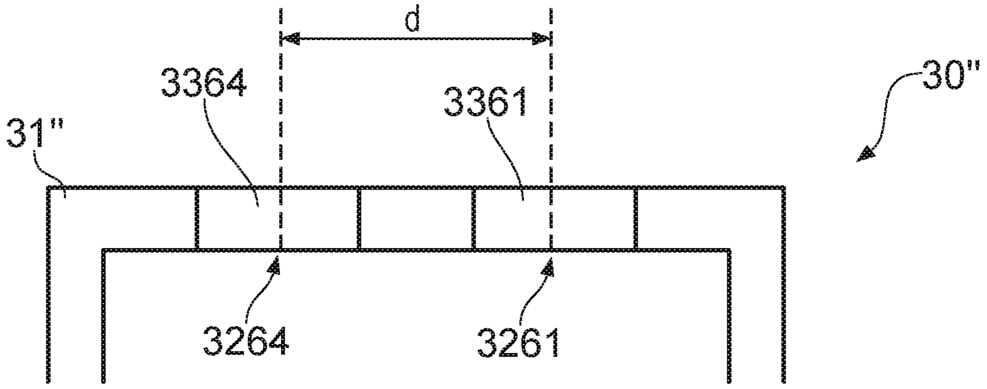

FIG. 8B schematically shows a second article 30" viewed in cross-section. Only the upper part of the article 30" is shown in FIG. 8B. The article 30" is substantially the same as article 30 described in FIG. 3, and only the differences with respect to article 30 are described herein.

The housing 31" of the article 30' differs from housing 31 of article 30 in that two openings 3261 and 3264 are provided in the housing 31". The two openings 3261 and 3264 are provided independently of one another, but are provided such that the reservoir 3 of the article 30" can be accessed through the openings 3261 and 3264. Each opening 3261 and 3264 comprises a respective septum 3361 and 3364, shown such that edges of the respective septa 3261 and 3264 abut the edges of the respective openings 3261 and 3264 (similarly to that shown in relation to FIG. 4A). The openings 3261 and 3264 may be circular in shape, and the septa 3361 and 3364 may be similarly shaped, although it should be appreciated that other shaped openings and septa may be used. The openings 3261 and 3264 are arranged such that the center of the openings 3261 and 3264 broadly align with longitudinal axes of the nozzles 61 and 64 of the nozzle arrangement 60'. That is, the separation distance between centers of the respective septa is the same or comparable to the separation distance d between the nozzles 61 and 64.

In use, when the nozzle arrangement 60' and the article 30" are relatively moved towards one another, each of the nozzles 61 and 64 pierce the corresponding septa 3361 and 3364. More specifically, nozzle 61 is arranged to pierce septum 3361 and nozzle 64 is arranged to pierce septum 3364. Each of the septa 3361 and 3364 can be configured differently (e.g., formed of different material) if desired. This option may provide greater flexibility for the designer of the dock 50/nozzle arrangement 60', as the choice of piercing element 61*d* and material for forming the septum 3361 is not dependent on the choice of piercing element 64*d* and material for forming the septum 3364—both combinations can effectively be designed separately.

As above, when both the opening 61*c* of the nozzle 61 and the opening 64*c* of the nozzle 64 are located within the reservoir 3, having respectively pierced the corresponding septa 3361 and 3364, the nozzle arrangement 60' is said to be in the second position and refilling can occur (as at step S4 and S5 of FIG. 6). Broadly speaking, the article 30" of FIG. 8B provides an example of an article 30" having a plurality of septa 3361 and 3364 being arranged such that the article 30" may be pierced at multiple locations (e.g., two locations) simultaneously.

Although both FIGS. 8A and 8B show the septum 33' or septa 3361 and 3364 located in the respective openings, it should be appreciated that the septum 33' or septa 3361 and 3364 may instead be configured as shown in FIG. 4B—that is, with the septum or septa extending beyond the opening 32' or openings 3261, 3264.

Additionally, although the nozzle arrangement 60' is shown as comprising one aerosol-generating material transfer nozzle 61 and one fluid transfer nozzle 64, other variations of the nozzle arrangement may comprise more than one aerosol-generating material transfer nozzle 61 and/or more than one fluid transfer nozzle 64.

Figure 9A:
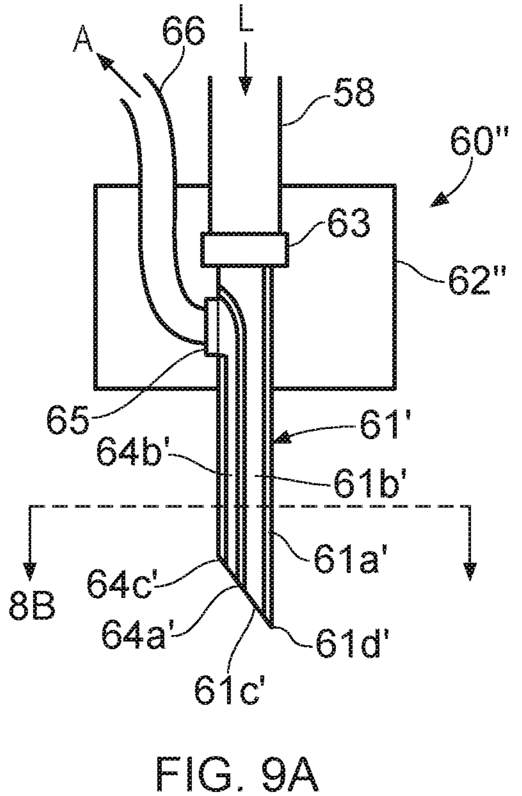
FIGS. 9A and 9B schematically show a side-on cross-sectional view and a bottom-up cross-sectional view of a second example of a nozzle arrangement configured to allow air to exit the reservoir of an article during the refilling process according to aspects of the present disclosure.
Figure 9B:
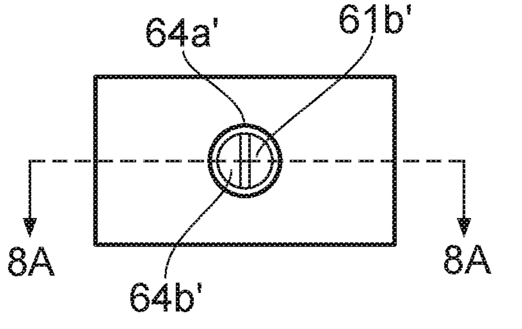

FIG. 9 schematically illustrates an alternative example of a nozzle arrangement 60" configured to allow fluid (such as air) to exit or escape the reservoir 3 of the article 30 when the nozzle 61 is operated to transfer aerosol-generating material (e.g., source liquid) to the reservoir 3 of the article 30. FIG. 9 includes FIG. 9A which schematically shows the nozzle arrangement 60" in a side-on cross-sectional view, and FIG. 9B which schematically shows the nozzle arrangement 60" in a cross-sectional view as viewed from the underside of the nozzle arrangement 60".

The nozzle arrangement 60" includes nozzle 61', nozzle head 62", coupling element 63, second coupling element 65 and fluid conduit 66.

The nozzle head 62" acts as the base for the nozzle arrangement 60" (similarly to nozzle head 62 discussed in FIGS. 3 to 6). The nozzle head 62" has a broadly similar configuration to nozzle head 62 in that the nozzle head 62" includes an internal coupling element 63 which is configured to fluidly couple together fluid conduit 58 and nozzle 61'. However, unlike nozzle head 62, nozzle head 62" of FIG. 9 includes an additional internal coupling element 65 which is arranged to fluidly couple a part of nozzle 61' to fluid conduit 66 (which is substantially the same as fluid conduit 66 of FIG. 7). In much the same way as discussed in respect of FIG. 7, the nozzle arrangement 60" is configured to allow aerosol-generating material (source liquid) to pass into the reservoir 3 via fluid conduit 58, and to allow air to escape reservoir 3 via fluid conduit 66.

The coupling elements 63 and 65 may be any suitable coupling element and may be substantially similar to coupling elements 63 and 65 discussed previously. Moreover, the coupling elements 63 and 65 may be internal to the nozzle head 62" or may be provided on external surfaces of the nozzle head 62" and fluidly coupled together via an internal passageway through the nozzle head 62'.

The primary difference between nozzle arrangement 60" and nozzle arrangement 60' is that nozzle arrangement 60" comprises a nozzle 61' which comprises two, separate passageways. More specifically, nozzle 61' comprises a first hollow passageway 61*b*' and a second hollow passageway 64*b*' within the nozzle 61'. The two hollow passageways 61*b*' and 64*b*' are fluidly separate from one another such that, within the nozzle 61', the two hollow passageway 61*b*', 64*b*' are isolated from one another and material moving along one passageway cannot interact with material moving along the other passageway.

In the example shown in FIG. 9, the nozzle 61' comprises an outer, approximate tubular structure formed by wall 61*a*'. The outer wall 61*a*' extends from a proximal end of the nozzle 61' (which is subsequently attached to the coupling element 63) to a distal end which protrudes from the nozzle head 62". Within the tubular structure is provided a separating wall 64*a*' which, for the majority of the nozzle 61', splits the tubular structure into two sections (see FIG. 9B in particular). In FIG. 9, the left hand side of the separating wall 64*a*' defines passageway 64*b*' and the right hand side of the separating wall 64*a*' defines passageway 61*b*'. As seen in FIG. 9A, the separating wall 64*a*' runs parallel to the axis of the nozzle 61 but closes off towards the proximal end of the nozzle 61' and prior to the coupling element 63. The outer wall 61*a*' comprises an outlet (not shown) which is coupled to coupling element 65. Accordingly, the separating wall 64*a*' effectively provides a volume separated from the volume defined by the tubular wall 61*a*'. At the distal end of the nozzle 61' is provided an opening which is split by the separating wall 64*a*' to define a first opening 61*c*' and a second opening 64*c*' corresponding respectively to the hollowed passages 61*b*' and 64*b*'.

In a similar manner to FIG. 7, the hollow passage 61*b*' is configured to allow aerosol-generating material (source liquid) to flow from the fluid conduit 58 and out of the nozzle 61' via the opening 61*c*'. Conversely, the hollow passage 64*b*' is configured such that air (or other fluid) is able to flow from the reservoir 3 into the hollow passage 64*b*' via the opening 64*c*', and out to the fluid conduit 66 via the not shown opening in the wall 61*a*' of nozzle 61'. Because the hollow passage 64*b*' is separate from the hollow passage 61*b*', air or fluid is permitted to flow along the hollow passage 64*b*' independently and uninfluenced by the aerosol-generating material moving via hollow passage 61*b*'. Thus, the nozzle 61' effectively combines the fluid transfer nozzle 64 and the aerosol-generating material transfer nozzle 61 into a single component. The second opening 64*c*' may be referred to herein as the fluid opening or the fluid inlet, while the first opening 61*c*' may be referred to as the aerosol-generating material opening. The first and second openings 61*c*', 64*c*' are provided separate from one another, although they may be positioned in close proximity of one another as shown in FIG. 9.

The distal end of the nozzle 61' further comprises a piercing element 61*d*' configured so as to pierce the septum 33 of the article 30. The piercing element 61*d*' may be configured in any suitable way as described above with respect to piercing element 61*d*.

The fluid conduit 66 is provided as a conduit for fluid (such as air) from the reservoir 3 to be passed along the hollow passage 64*b*' of the nozzle 61' to a suitable location for storage/expulsion. In the case of air, the conduit 66 may lead to an opening in the housing of the dock 50. The fluid conduit 66 may be formed of any suitable material, such as plastic, and be formed in a tubular shape. It should be appreciated however that while fluid conduit 66 is shown in FIG. 9A, in other implementations fluid conduit 66 may be omitted, particularly where the fluid that is evacuated from the reservoir 3 is air. That is, the end of the connector element 65 not coupled to the nozzle 61 may be open to the environment/inner space of the dock 50, where in the latter case, the fluid (air) may escape through any gaps in the housing of the dock 50. Equally, the connecting element 65 may be omitted as well, in some implementations. The opening (not shown) may be positioned within the nozzle head 62" or may be positioned between the nozzle head 62" and the distal end of the nozzle 61'. In either case, the opening for allowing air or other fluid to pass from the nozzle 61' to the environment is provided at a location that is outside of the reservoir 3 when the nozzle arrangement 60" is relatively moved to be in the second position, thereby allowing air or other fluid to exit the reservoir 3 via the outlet.

Although FIGS. 9A and 9B show a particular configuration of the nozzle 61', it should be appreciated that other configurations are contemplated and the skilled person will be able to arrange a suitable nozzle 61' having both a first and second hollow passages 61*b'*, 64*b'* for transporting aerosol-generating material and air/fluid into and out of the reservoir accordingly. For instance, the hollow passage 64*b'* does not necessarily have to share the opening at the distal end of the nozzle 61'. Instead, the opening 64*c'* may be provided at a position on the outer surface of the wall 64*a'* rather than at the distal end.

Hence, the nozzle head 62" in accordance with the present implementations comprises a single nozzle comprising distinct passages therein, each passage having an associated inlet and outlet provided within the nozzle 61'. The first passage, hollow passage 61*b'*, is designed to facilitate the transfer of aerosol-generating material from the refill reservoir 40 to the reservoir 3 of the article 30, while the second passage, hollow passage 64*b'*, is designed to facilitate the transfer of fluid (e.g., air) out of the reservoir 3 as a result of the refilling operation. Accordingly, the nozzle arrangement 60' is configured to both supply aerosol-generating material to the reservoir 3 and allow gas/liquid to escape the reservoir 3 during the refilling process. As discussed above in respect of FIGS. 3 to 6, the nozzle head 62" is configured to relatively move with respect to an article 30 in the article port 56 (either by the nozzle head 62" moving relative to a static article 30, an article 30 moving relative to a static nozzle head 62" or both the article 30 and nozzle head 62" moving relative to one another). Accordingly, in the shown implementation, the combined nozzle 61' pierces the septum 33 when relative movement between the nozzle arrangement 60" and the article 30 occurs. When the nozzle arrangement 60" and article 30 are positioned in the second position, the openings 61*c'* and 64*c'* are located in the reservoir 3 (below the septum 33) while the opening that allows air to exit the reservoir 3 is located outside the reservoir 3 (above the septum 33). In this way, a combined nozzle can be used to effectively refill the reservoir 3.

Hence, in accordance with aspects of the present disclosure, the dock 50, and more specifically the nozzle arrangement 60', 60" thereof, may be configured to both transfer aerosol-generating material to the reservoir 3 and allow fluid (e.g., air) to escape the reservoir 3 to thereby help equilibrate the pressure within the reservoir 3 as a result of a refilling operation. Providing such an arrangement not only facilitates a simple refilling procedure via the piercing of the septum or a plurality of septa, but also improves the robustness of the refilling operation by helping to reduce stresses on the article 30 which may lead to leakage of the aerosol-generating material.

In the implementations of the nozzle arrangements 60' and 60" shown in FIGS. 7 and 9, the aerosol-generating material opening 61*c* or 61*c'* for allowing aerosol-generating material to enter the reservoir 3 is positioned at a different location in the direction of the longitudinal axis of the nozzle 61 or 61' as compared to the fluid opening 64*c* or 64*c'* for allowing air or fluid to exit the reservoir 3. More specifically, in the implementations shown, the aerosol-generating material opening 61*c* or 61*c'* is positioned further from the proximal end of the nozzle 61 or 61' than the fluid opening 64*c* or 64*c'*.

In the implementations that have currently been described, aerosol-generating material exiting the nozzle 61, 61' generally flows away from the nozzle 61, 61'. That is, nozzle 61, 61' pierces the top of the article 30 (via the septum) and aerosol-generating material exits the nozzle 61, 61' and flows towards the bottom surface of the article 30. The article 30 is essentially held in the article port 56 such that, in the direction in which gravity acts, the surface of the housing of the article 30 including the septum/septa is positioned before the opposing surface of the housing of the article 30. Such a configuration may be referred to as a "top-filled article" where the article is filled via the top surface of the article, relative to the direction of gravity. In such top-filled configurations, it may be advantageous to provide the aerosol-generating material opening 61*c* or 61*c'* further from the septum or septa than the fluid opening 64*c* or 64*c'* such that it becomes difficult for aerosol-generating material exiting the aerosol-generating material opening 61*c* or 61*c'* to subsequently enter the fluid opening 64*c* or 64*c'* (as an aerosol-generating material effectively has to flow against gravity to be able to enter the fluid opening 64*c* or 64*c'*). More broadly, in such a configuration, the fluid opening 64*c*/64*c'* is arranged or positioned such that the fluid opening 64*c*/64*c'* is closer to the septum 33, 33', 3361 of the article 30, 30', 30" than the aerosol-generating material opening 61*c*/61*c'* when the aerosol-generating material delivery nozzle 61/61' is operated to transfer aerosol-generating material to the storage area of the article 30, 30', 30".

Conversely, in other implementations, the article 30 may be filled differently. For instance, some implementations may orient the article 30 in the article port 56 such that, in the direction in which gravity acts, the surface of the housing of the article 30 including the septum/septa is positioned after the opposing surface of the housing of the article 30. Such a configuration may be referred to as a "bottom-filled article" where the article is filled via the bottom surface of the article, relative to the direction of gravity. In this configuration, the nozzle 61, 61' pierces the bottom of the article 30 (via the septum) and aerosol-generating material flows along the nozzle 61, 61' (in a direction broadly opposite to the direction along which gravity acts) and flows essentially back on itself towards the bottom surface of the article 30 when exiting the nozzle 61, 61'. In such top-filled configurations, it may be advantageous to provide the aerosol-generating material opening 61*c* or 61*c'* closer to the septum or septa than the fluid opening 64*c* or 64*c'* such that it becomes difficult for aerosol-generating material exiting the aerosol-generating material opening 61*c* or 61*c'* to subsequently enter the fluid opening 64*c* or 64*c'* (as aerosol-generating material would only be able to enter the fluid opening 64*c*/64*c'* once the level of the aerosol-generating material within the reservoir surpasses the distance of the fluid opening 64*c*/64*c'* from the septum or septa). More broadly, in such a configuration, the fluid opening 64*c*/64*c'* is arranged or positioned such that the fluid opening 64*c*/64*c'* is further from the septum 33, 33', 3361 of the article 30, 30', 30" than the aerosol-generating material opening 61*c*/61*c'* when the aerosol-generating material delivery nozzle 61/61' is operated to transfer aerosol-generating material to the storage area of the article 30, 30', 30".

It should be appreciated that the above principles may be applied to configurations where the article 30 is held in the article port 56 at different angles relative to the direction in which gravity acts. Thus, based on the refilling arrangement of the article and nozzle arrangement, the skilled person may suitably select relative positions of the fluid opening 64*c*, 64*c'* and the aerosol-generating material opening 61*c*, 61*c'* such that aerosol-generating material exiting the aerosol-generating material opening 61*c*, 61*c'* cannot easily flow into the fluid opening 64*c*, 64*c'*.

The above has broadly described a refilling system in which a refilling device (dock 50) is configured to refill an article 30, 30', 30" using a nozzle arrangement 60, 60', 60" comprising a nozzle 61, 61' configured to pierce at least one septum 33, 33', 3361 of the article 30 to be able to transfer aerosol-generating material (e.g., source liquid) to the reservoir 3 of the article 30, 30', 30" when the nozzle 61, 61' has pierced the septum 33, 33', 3361 and a corresponding opening 61*c*, 61*c*' in the nozzle 61, 61' is located within the reservoir 3. In some implementations (for instance where the article 30 is unable to vent gas or other liquid during the refilling of the reservoir 3), the nozzle arrangement 60, 60', 60" is provided with a mechanism for allowing venting of fluid from the reservoir 3 during the refilling process, with said mechanism including a separate fluid transfer nozzle 64 designed to pierce the same or a different septum 3364 or a combined nozzle 61' additionally including a passage for the transfer of fluid from the reservoir 3 separate to the passage for transfer of aerosol-generating material to the reservoir 3. The or each septum 33, 33', 3361, 3364 is configured to enable the corresponding nozzle 61, 61', 64 to pierce the septum 33, 33', 3361, 3364 when the nozzle 61, 61', 64 is moved relatively towards the or each septum 33, 33', 3361, 3364 with a suitable force, but also to allow the or each septum 33, 33', 3361, 3364 to reseal after the nozzle 61, 61', 64 has been withdrawn from the reservoir 3. Accordingly, a simple refilling operation with a low number of moving parts can be produced, enabling easy refilling of the reservoir 3 of the article 30, 30', 30" with suitable aerosol-generating material.

As described above the septum 33 of an article 30 can be formed from any suitable material displaying the appropriate characteristics-primarily, the ability to be pierced by a piercing element of a nozzle and the ability to reseal after the piercing element/nozzle has been withdrawn from the reservoir 3/article 30. These characteristics may be dependent on the size and shape of the nozzle to pierce the corresponding septum (which may be dependent on the type of/characteristics of the aerosol-generating material to be transferred) as well as the characteristics of the aerosol-generating material to be stored in the reservoir 3 (e.g., in terms of the reactivity of the material of the septum with the aerosol-generating material and/or the permeability of the material of the septum in respect of the aerosol-generating material). The septum may also be self-supporting when mounted to cover the opening of the article (for example, it should not sag under its own weight), a characteristic which is dependent on the thickness and/or density of the septum as well as the size of the opening which the septum is designed to cover.

While the success and failure of certain materials for the septum can be determined empirically or through computer modelling, in some instances, it may be difficult to create, obtain or readily source materials which are able to achieve the desired characteristics for a given nozzle arrangement/article combination. Thus, in accordance with a further aspect of the present disclosure, the or each septum 33, 33', 3361, 3364 (herein referred to collectively as septum 33 for convenience unless otherwise stated) may be formed from a plurality of layers, wherein at least two of the layers have different hardness characteristics. In this regard, it should be appreciated that the "hardness" of a layer may be dependent both on the type of material that is used as well as other characteristics such as the thickness of the layer. The hardness of a material may be measured using a durometer to measure the shore hardness of the material/layer.

Figure 10:
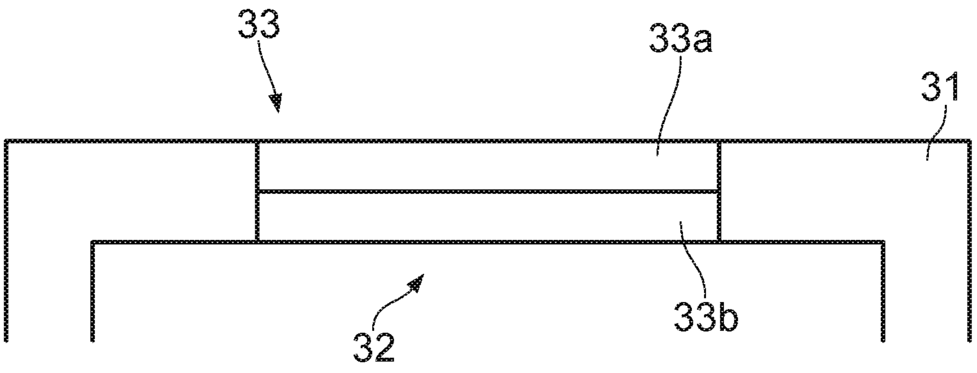
FIG. 10 schematically shows a modification of the septum in accordance with another aspect of the present disclosure, and more specifically, shows a septum comprising a plurality of layers having different characteristics.

FIG. 10 schematically shows an implementation of a septum 33 formed in accordance with the principles of the present disclosure. FIG. 10 is based on the arrangement shown in FIG. 4A and shows the septum 33 forming part of the article 30 of FIG. 4A. However, it should be appreciated that the septum 33 may instead be configured as in FIG. 4B to extend beyond the opening 32 of the article 30. Equally, the septum 33 disclosed in FIG. 10 may be used in place of any of the septa 33, 33', 3361, 3364 described previously.

As seen in FIG. 10, the septum 33 comprises a first layer 33*a* and a second layer 33*b*. The first layer 33*a* and the second layer 33*b* are arranged such that one overlaps the other to form a laminate structure. The first layer 33*a* and second layer 33*b* may be joined together using any suitable technique, for example by using adhesive, welding or by a suitable molding technique. The laminate structure of the septum 33 of FIG. 10 therefore has a first surface formed by the exposed surface of the first layer 33*a* of material and a second surface, opposite the first, formed by the exposed surface of the second layer 33*b*. When the septum 33 is arranged to cover the opening 32, the first layer 33*a* forms a part of the outer surface of the article 30 (facing the external environment of the article 30) whereas the second layer 33*b* forms a part of the inner surface of the article 30 (facing the interior of the reservoir 3 of the article 30). That is to say, the first layer 33*a* is arranged further from the storage area (reservoir 3) than the second layer 33*b*.

Each of the layers 33*a*, 33*b* individually covers the opening 32. That is, the first layer 33*a* is sized so as to cover the opening 32 and the second layer 33*b* is also sized so as to cover the opening 32, so that each layer extends at least across the opening 32. In other words, the first layer 33*a* and the second layer 33*b* both cover the whole of the opening 32. As discussed above, a nozzle (e.g., nozzle 61, 61' or 64—collectively referred to herein as nozzle 61 unless specified otherwise) may pierce the septum 33 and the septum 33 is arranged such that, in the direction of the piercing, the nozzle 61 passes through/pierces both the first layer 33*a* and the second layer 33*b* before the nozzle 61 is able to access the reservoir 3. In the shown implementation, the first and second layers 33*a* and 33*b* extend across the whole of the opening 32, and such a configuration may be relatively simpler to manufacture, but in other implementations the second layer 33*b* may be provided in only a region of the first layer 33*a* (for example a central region), and may not completely extend from one side of the opening to the other in an effort to reduce material usage.

The first layer 33*a*, which is arranged further from the storage area 3 than the second layer 33*b* in the shown implementation, is formed of a material that is relatively harder than the material forming the second layer 33*b*. The second layer 33*b* which is formed of relatively softer material provides the sealing/re-sealing functionality. Generally, and as discussed above, the softer the material, the easier it is to penetrate with a piercing element and the easier it is to re-seal when the piercing element is removed. However, due to the increased softness, the material is more likely to sag and/or deform before piercing by the piercing element 61*d* of the nozzle 61, thus decreasing the robustness of the article 30 (particularly in instances where the size of the opening 32 and septum 33 are relatively large—e.g., as in FIG. 8A). The first layer 33*a* which is formed of the relatively harder material is provided to add rigidity to the septum 33. Therefore, to help increase the overall rigidity of the septum 33, the septum 33 comprises a relatively harder material which may be more difficult to pierce with a piercing element, but provides rigidity to the second layer 33*b*. The increased rigidity may prevent unintentional deformation or tearing of the septum 33, e.g., due to the deformation caused by the nozzle 61 pressing against the septum 33 or in the event that an object (such as a user's finger or other implement such as a pen, for example) should inadvertently press against the septum 33. Hence, providing a septum 33 formed of different layers 33*a*, 33*b*, where at least some of the layers have different hardnesses, can provide a septum having improved overall characteristics. That is, a relatively soft material can be selected for its ability to reseal, and a relatively hard material can be selected for its structural ability, to thereby create a hybrid material having good rigidity and good resealability. Additionally, it has been found that providing a two-layer septum comprising a first, relatively harder layer 33*a* and a second, relatively softer layer 33*b* enables both a quick (i.e., quick to form the seal) but shorter-term seal upon withdrawal of the nozzle 61 from the septum 33 as well as a slower (i.e., slower to form the seal) but longer-term seal upon withdrawal of the nozzle 61 owing in part to the properties of the different layers of the septum 33.

Although it has been shown above that the septum 33 comprises a first layer 33*a* of a relatively harder material positioned above a second layer 33*b* of relatively softer material, it should be appreciated that in other implementations, the layers may be reversed, although this may lead to different performance characteristics versus the abovementioned configuration. That is, the second layer 33*b* of relatively softer material may be positioned with a surface that forms a part of the external surface of the article 30, whereas the first layer 33*a* of relatively harder material may be positioned with a surface that forms a part of the inner surface of the reservoir 3.

In some implementations, the two layers of the septum 33, the first layer 33*a* and second layer 33*b*, may be formed from different materials. For example, the first layer 33*a* may be formed from PTFE (or another material) having a shore hardness of 54 to 57 on the Shore D scale, or a similar, relatively harder plastic material, while the second layer 33*b* may be formed from a relatively softer silicone material having a shore hardness less than 95 on the Shore A scale, for example, less than 90, or less than 80, or less than 70. The shore hardness may be as low as 30 to 40 on the Shore A scale. The shore hardness can be measured using a Durometer in accordance with conventional testing techniques and conditions, where the difference between the Shore A and Shore D tests are the shape/dimensions of the probe used to probe the material to be tested.

In other implementations, the two layers of the septum 33, the first layer 33*a* and second layer 33*b*, may be formed from the same materials, but with each layer having different hardness characteristics. For instance, the first layer 33*a* may be formed from a silicone having a shore hardness on the order of 50 to 60 in the Shore D scale, which is around 97 to 100 on the Shore A scale. The second layer 33*b* may be formed from a silicone having a shore hardness less than 95 on the Shore A scale, for example, less than 90, or less than 80, or less than 70. The shore hardness for the second layer may be as low as 30 to 50 on the Shore A scale, for example 40. Silicone is particularly suitable as a material to use for a septum because silicone is more robust than materials such as PTFE which may have a tendency to break/fragment during use, particularly over multiple insertions of a nozzle. Alternatively, or additionally, the differences in shore hardness may be achieved by varying the thicknesses of the two layers formed from the same material. For example, the thicknesses of the first and second layers may be altered, in the range of 0.3 to 5 mm, to provide difference performance characteristics of the two layers of the septum 33. Accordingly, by varying the thickness of the layers used, e.g., the silicone first and second layers, the overall properties of each of the layers may be altered and layers having different shore hardnesses, and therefore different performance characteristics, may be realised.

It should be appreciated that the above provides a non-exhaustive list of examples in which a two-layer septum 33 having different hardnesses, and thus performance characteristics, for each of the layers may be realised. The present disclosure is not limited to the above examples. Additionally, the examples above describe septa having two-layers with shore hardnesses on the Shore A scale of 97 to 100 and 95 to 30 respectively. However, this should not be considered a limiting example of the present disclosure. Indeed, in other implementations, the harder of the two layers may have a shore hardness in the range of 40 to 60 on the Shore A scale and the softer of the two layers may have a shore hardness in the range of 30 to 50. The exact hardnesses which are suitable for a given multi-layer septum may depend on several factors, such as the nozzle 61 size/shape, etc. The hardnesses may be determined empirically or through computer modelling for any given arrangement. However, in accordance with the principles of the present disclosure, at least two of the layers forming the multi-layer septum are provided with different hardnesses/hardness characteristics.

In the event that the septum 33 is formed of the first layer 33*a* and the second layer 33*b* having different hardness characteristics, then such a septum 33 may comprise a first layer 33*a* having a relative hardness which may be difficult to pierce with a given nozzle/piercing element. To help improve the ability for a given nozzle/piercing element to pierce such a laminate septum 33, the laminate septum 33 may be provided with a weakened region designed to allow the piercing element/nozzle to more easily pierce the septum 33 within the weakened region as compared to other regions of the laminate septum 33 not comprising the weakened region.

Figure 11:
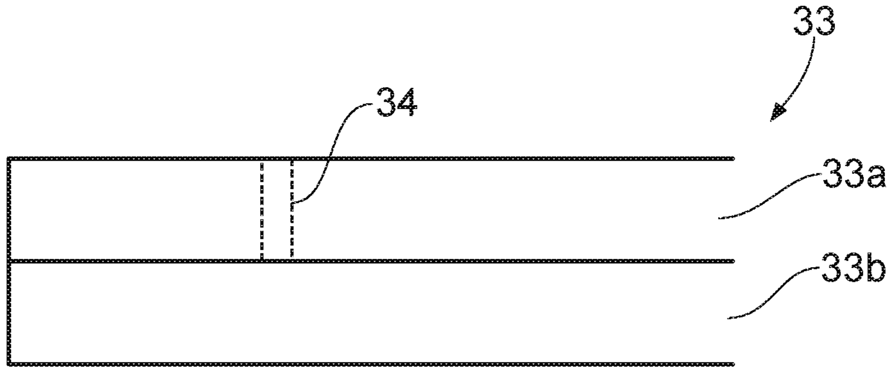
FIG. 11 schematically shows a modification of the septum of FIG. 10 where the septum includes a weakened region for facilitating the piercing of the plurality of layers of the septum.

FIG. 11 schematically shows a part of the septum 33 of FIG. 10 further comprising a weakened region 34. In FIG. 11, only a part of the septum 33 is shown, with certain features from FIG. 10 being omitted for clarity.

As can be seen in FIG. 11, the septum 33 comprises a weakened region 34, shown by the vertically arranged dotted lines. The weakened region 34 is a region of the septum 33 which has been modified or otherwise constructed so as to be more easily pierced than the surrounding parts of the septum 33. The weakened region 34 is therefore intended to be pierced by the nozzle 61 during a refilling operation using the dock 50, and is sized accordingly so that it may align with the nozzle 61 when the nozzle 61 is moved relative to the article 30. Providing a weakened region 34 in the septum 33 means relatively less force may be required to pierce the septum 33 and/or a relatively blunter piercing element can be used in the nozzle arrangement 60 to pierce the septum 33.

The weakened region 34 may include a material which has been modified to be more easily pierced. For example, the weakened region 34 may include a relatively softer material disposed in the weakened region 34 compared to the surround material forming the septum 33. In other implementations, the weakened region 34 is formed by mechanically manipulating the septum 33 at the weakened region 34. More specifically, one may piercing the septum 33 in advance to introduce a weakened region 34, e.g., in advance of attaching the septum 33 to the article 30 in a manufacturing setting. When pre-piercing the septum 33, when the piercing element is passed through the first layer 33*a* of harder material and the second layer 33*b* of softer material and then retracted, immediately after retraction, the piercing element leaves an opening in both the first layer 33*a* and the second layer 33*b*, where the second layer 33*b* is formed of a relatively softer material. Assuming the diameter of the piercing element is not too large, the hole generated in the second layer 33*b* reseals as described above, while the hole in the first layer 33*a* formed of harder material does not reseal or reseals to a lesser extent. In either case, the resistance to passing a piercing element through the weakened region (after pre-piercing) decreases, meaning that less force for driving the piercing element is required in the dock 50 and/or a blunter piercing element may be used as described above.

This effect will most likely be noticeable in respect of the harder first layer 33*a* but that is not to say that the pre-piercing has no effect on the second, softer layer 33*b*, in some implementations. That is, in some implementations, the weakened region 34 may be present only in (or substantially in) the first layer 33*a* of the septum 33. In other implementations, the weakened region 34 may also be present in the second layer 33*b* of the septum 33.

The laminate septum 33 as shown in FIGS. 10 and 11 may be applied to any of the articles 30, 30', 30" discussed in relation to FIGS. 3 through 9. More explicitly, the laminate septum 33 may be applied to articles 30 intended to be used with a single nozzle 61 or 61', e.g., such as with the nozzle arrangements 60, 60" such as shown in FIGS. 3, 5, and 9A, and 9B. The laminate septum 33 of the laminate septum 33 may be applied to articles 30', 30" intended to be used with a dual nozzle 61, 64 nozzle arrangement 60' such as shown in FIGS. 7A and 7B. More specifically, the laminate septum 33 may be applied to the articles shown in FIGS. 8A and 8B.

In the case of the article 30' shown in FIG. 8A, the septum 33 is sized so as to be pierced at two different locations of the septum 33 by a first piercing element (nozzle 61) and a second piercing element (nozzle 64). The septum 33 is sized appropriately (that is, having at least one dimension greater than the separation distance d between the aerosol-generating material transfer nozzle 61 and the fluid transfer nozzle 64). The septum 33 in such instances may have multiple (e.g., two) weakened regions 34 to allow for the aerosol-generating material transfer nozzle 61 to pierce through the septum 33 at one weakened region 34 and the fluid transfer nozzle 64 to pierce through the septum 33 at another weakened region 34. However, it should be appreciated that in some implementations, because the fluid transfer nozzle 64 may have different characteristics to the aerosol-generating material transfer nozzle 61, the weakened region 34 for receiving the fluid transfer nozzle 64 may be different from the weakened region 34 for receiving the aerosol-generating material transfer nozzle 61. In some implementations, only one weakened region 34 may be provided for either the fluid transfer nozzle 64 or the aerosol-generating material transfer nozzle 61.

In the case of the article 30" shown in FIG. 8B, the laminate septum 33 may be employed as the first septum 3361 and/or the second septum 3364. As above, because the fluid transfer nozzle 64 may have different characteristics to the aerosol-generating material transfer nozzle 61, the laminated septum 33 may be employed for one or both of the first septum 3361 and the second septum 3364 if required. That is, in one example, the laminate septum 33 of FIG. 10 or 11 may be employed as the septum 3361 while a septum 33 comprising a single material may be employed as the septum 3364. Additionally, in other implementations, the laminate septum 33 may be employed as the septum 3364. That is, septum 3364 comprises a first layer 33*a* and a second layer 33*b*, wherein the first layer 33*a* is formed of a material that is relatively harder than a material forming the second layer.

Hence, there has been described an article 30 comprising at least one septum which is formed of a first layer 33*a* and a second layer 33*b*, where the first layer and the second layer have different hardness characteristics. The different hardness characteristics are for performing different functions associated with the septum—a relatively softer material is intended to be pierced by a piercing element and reseal when removed the piercing element is removed to provide selective access to the reservoir 3 for storing aerosol-generating material, while the relatively harder material is provided to help improve the structural rigidity. Providing a septum formed from different materials allows additional materials that would be unsuitable on their own to be used in combination with other potentially unsuitable materials to subsequently expand the range of available materials to a design of the septum 33.

It should be appreciated that while the above has described a septum as comprising a first and a second layer, in other implementations, the septum may comprise a plurality of layers. The plurality of layers of the septum may all be different (or rather, formed of different material or the same materials having different characteristics) or there may be layers formed of the same materials. For example, with reference to FIG. 10, in some implementations, the septum 33 may be a three layer laminate structure comprising an additional layer below the second layer 33*b* (that is, an additional layer closer to the reservoir 3). The additional layer may be formed from the same material that is used to form the first layer 33*a* (that is, the relatively harder material). This may further help improve the rigidity of the septum 33. Alternatively, the additional layer may be formed from a material which is chemically resistant (inert) to one or more constituents of the aerosol-generating material, for example, nicotine. This may help improve the lifetime of the septum and may reduce any adverse effects such as degradation of the septum or leeching of the nicotine into the second layer of the septum.

Figure 12A:
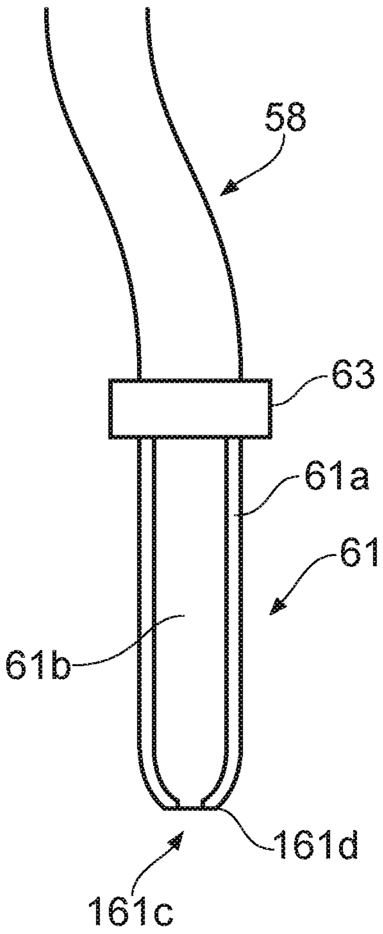
FIGS. 12A and 12B schematically show simplified cross-sectional views of the nozzle arrangement of FIG. 5 including embodiments of blunter piercing elements of the nozzle in accordance with aspects of the present disclosure.
Figure 12B:
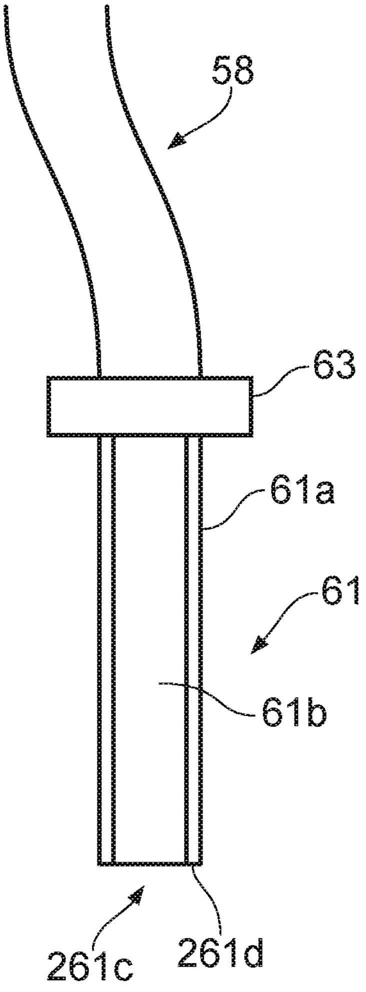

Additionally, it has been described above that the distal end of the nozzle 61 comprises a piercing element 61*d*, which in the example of FIG. 5, is provided by the distal end of the nozzle 61 being shaped such that the end tapers to a point or sharp edge. However, the piercing element 61*d* may be configured in any suitable way so as to be able to pierce the septum 33 of the article 30. FIGS. 12A and 12B show further examples of the piercing element of the nozzle 61 which may be suitable in certain implementations of the present disclosure. Generally, the piercing elements of the nozzles 61 of FIGS. 12A and 12B have a relatively blunter end, as described in more detail below. A blunter end has been shown to have less impact on the integrity of the septum 33 over a number of insertions and withdrawals (e.g., upwards of 100 insertions/withdrawals). Thus, while a greater force may be required to pierce the septum 33 with a relatively blunter piercing element, the integrity/lifetime of the septum over multiple insertions/withdrawals can be improved.

FIGS. 12A and 12B will be understood from FIG. 5. Like components are provided with the same reference numerals and the reader is referred to the text above for a description of these components. Only the differences are described herein.

In FIG. 12A, the piercing element 161*c* provided at the distal end of the nozzle 61 is to have rounded edges (approximating a truncated dome-shape). That is, the side walls 61*a* of the nozzle 61 in the vicinity of the distal end of the nozzle 61 curve inwards towards the central longitudinal axis of the nozzle by a greater amount with increasing distance from the proximal end of the nozzle 61. The piercing element 161*c* is formed with an opening 161*c* to allow the passage of aerosol-generating material out from the nozzle 61 to the article 30 and in this instance, the opening 161*c* is circular when viewed along the axis of the nozzle 61 and is of a smaller diameter than the passage 61*b*. The piercing element 161*d* is truncated to allow for the opening 161*c* to be formed.

It should also be appreciated that the rounded, truncated dome-shape may be replaced with alternative shapes, such as a truncated cone, which may also form the piercing element 161*d* with a blunter end than the tapered piercing element 61*d* of FIG. 5. Furthermore, it should also be appreciated that the opening 161*c* is smaller than the opening 61*c* in FIG. 5 and thus it may be suitable to make modifications to the nozzle and/or transfer mechanism 53 to achieve certain transfer rates for the aerosol-generating material.

FIG. 12B shows an alternative piercing element 261*d* in which the distal end of the nozzle 61 is effectively formed flat. In other words, the opening 261*c* of the nozzle 61 is provided in a plane that is perpendicular to the longitudinal axis of the nozzle 61. The piercing element 261*d* is therefore an annulus having a thickness equal to the walls 61*b* of the nozzle 61 (although it should be appreciated the walls 61*b* may be tapered or flared in the vicinity of the distal end of the nozzle to provide a certain shape of the piercing element 261*d* if required).

Accordingly, FIGS. 12A and 12B show some further examples of the piercing element 161*d*, 261*d* which are relatively blunter than the tapered piercing element 61*d* of FIG. 5. It should be appreciated that other suitable forms of piercing elements may also be employed in accordance with aspects of the present disclosure, and FIGS. 5, 12A, and 12B should not be considered as an exhaustive list of examples of piercing elements. Finally, while FIGS. 12A and 12B have been shown in respect of the nozzle of FIG. 5, it should be appreciated that blunter piercing elements such as those of FIGS. 12A and 12B may be applied to the embodiments of the nozzles described in respect of FIGS. 7A, 7B, 9A and 9B.

Additionally, when the aerosol-generating material to be stored in the reservoir 3 of the article 30 is a liquid, then it is not necessary for both the first layer 33*a* and second layer 33*b* of the laminate septum 33 to be impermeable to the source liquid. Rather, only one of the layers 33*a* or 33*b* may be impermeable to the source liquid, thereby further expanding the range of available materials to a designer of the septum 33.

Further, while it has been described above that the article 30 comprises a septum 33 and the dock 50 comprises a nozzle arrangement 60 to engage with and transfer aerosol-generating material, e.g., source liquid, to the article 30 via piercing the septum 33, it should be appreciated that the same or similar principles may be applied to the refill reservoir 40.

Figure 13:
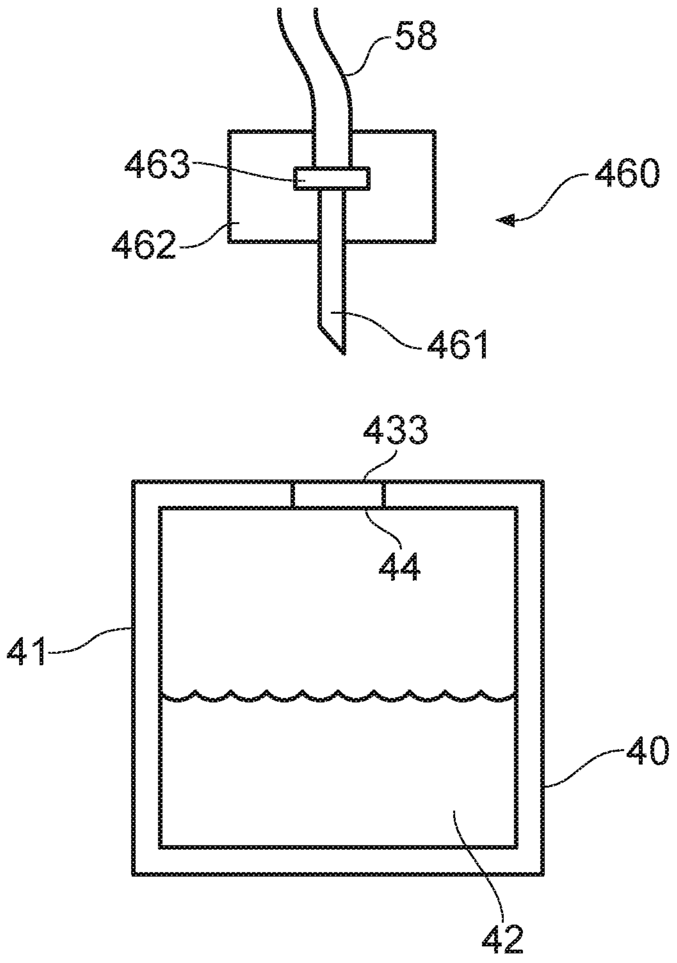
FIG. 13 shows a simplified cross-sectional view of a nozzle arrangement including a nozzle having a piercing element and a refill reservoir comprising a septum configured to be pierce by the piercing element for effecting refilling of the article from the refill reservoir according to an example of the disclosure.

FIG. 13 broadly shows a refill reservoir 40, such as the refill reservoir of FIG. 2, in addition to nozzle arrangement 460. FIG. 13 will be understood from FIG. 3, albeit in the context of the refill reservoir 40 and not the article 30.

As described previously, the refill reservoir 40 comprises a wall or housing 41 that defines a storage space for holding aerosol-generating material 42, such as a source liquid. The refill reservoir 40 also includes the outlet orifice or opening 44 by which the aerosol generating material 42 can pass out of the refill reservoir 40.

In addition, the refill reservoir 40 comprises a septum 433 that covers the opening 44 of the refill reservoir 40. The septum 433 is substantially the same as septum 33 described previously in respect of the article 30 (for example, it may be the same or similar to any of the septa described in relation to the embodiments of FIGS. 3, 4A, 4B, 8A, 8B, 10, 11). The septum 433 may be appropriately sized in accordance with the opening 44. It should further be understood that the if both the article 30 and refill reservoir 40 comprise septa, the two septa may not necessarily be the same (i.e., have the same dimensions, formed of the same material, or have the same properties).

In a similar manner, the dock 50 comprises a nozzle arrangement 460. The nozzle arrangement 460 may be substantially similar to any of the nozzle arrangements 60 described above in respect of the article 30. For example, the nozzle arrangement 460 comprises a nozzle 461 (which may be substantially the same or similar to the nozzle 61), a nozzle head 462 (which may be substantially the same or similar to the nozzle head 62), a coupling element 463 (which may be substantially the same or similar to the coupling element 63) and the conduit 58. In this regard, the conduit 58 may be coupled at one end to the nozzle 61 for refilling the article 30 and at the other end to the nozzle 461 for extracting aerosol-generating material from the refill reservoir 40. Additionally, the nozzle 61 is described as an aerosol-generating material delivery nozzle, whereas in FIG. 13 the nozzle 461 is described as an aerosol-generating material extraction nozzle configured to extract aerosol-generating material from the refill reservoir via an opening (not shown in FIG. 13, but similar to opening 61*c*) in the nozzle 461. Otherwise, nozzle 461 may be substantially similar to nozzle 61 as described above.

In some implementations, the nozzle head 462 for interacting with the refill reservoir 40 may be substantially separate and independent of the nozzle head 62 for interacting with the article 30. That is, the nozzle head 462 may be operated independently (e.g., moved) of the nozzle head 62. In a similar manner, to engage the nozzle 461 with the refill reservoir 40, the nozzle head 462 and/or the refill reservoir 40 are moved relative to one another to bring the two closer together such that the nozzle 461 pierces the septum 433 of the refill reservoir 40. It should be appreciated that before the transfer mechanism 53 operates to transfer aerosol-generating material to the article 30, the nozzle 461 is arranged/controlled to pierce the septum 433 of the refill reservoir 40. It should be appreciated that the nozzle 61 is coupled to the nozzle 461 via the conduit 58 and, if the nozzle heads 62 and 462 are arranged to move independently, the conduit 58 may be formed of a flexible material to not hinder such movement.

Although not shown in FIG. 13, in some implementations, the nozzle head 62 and nozzle head 462 may be the same component. That is, the single nozzle head may comprise both the nozzle 61 and the nozzle 461; for example, the nozzle 461 may protrude in one direction from the nozzle head and the nozzle 61 may protrude from the nozzle head in the other direction, opposite to the direction of the nozzle 461. Accordingly, in some implementations, the nozzle 61 and nozzle 461 may be joined via the conduit 58, or the conduit 58 may be omitted and the nozzles 61 and 461 are either joined via the coupling elements 63, 463 or are integrally formed with one another. In instances where the conduit 58 is omitted, the use of a peristaltic pump as the transfer mechanism 53 may not be suitable, and a different transfer mechanism may be required. For example, the refill reservoir 40 may be at least partly deformable and the transfer mechanism 53 may act on the refill reservoir 40 to squeeze/push aerosol-generating material along the nozzles to the article 30 (although it should be appreciated that such a transfer mechanism is not exclusively limited to the instance where the conduit 58 is omitted or the nozzles are located in the same nozzle head).

In addition, although not shown in FIG. 13, the nozzle arrangement 460 may be modified according to any of the arrangements described in relation to FIGS. 7A, 7B, 9A and 9B to include some mechanism for allowing air to enter the refill reservoir during refilling (noting that aerosol-generating material is withdrawn from the refill reservoir 40). More specifically, the nozzle head 462 may include a separate nozzle for airflow (as in FIGS. 7A and 7B) or a modified nozzle 461 having a separate channel for airflow (as in FIGS. 9A and 9B). Alternatively, the nozzle/nozzle head may not comprise a separate channel for airflow into the refill reservoir 40 and the refill reservoir 40 may be adapted to accommodate for pressure changes inside the refill reservoir 40 caused by withdrawing the aerosol-generating material (e.g., via a suitable valve or via a deformable portion of the refill reservoir 40).

Accordingly, it should be appreciated that one or both of the article 30 and refill reservoir 40 may be provided with one or more septa and the dock 50 may be provided with a suitable nozzle arrangement 60, 460 designed to engage with and pierce the septum/septa to allow for the transfer of aerosol-generating material from the refill reservoir 40 to the article 30. In instances where the article or refill reservoir 40 does not comprise a septum, a different mechanism for interacting with the article 30/refill reservoir 40 may be provided (e.g., such as a suitable valve arrangement). However, the use of septa on both the refill reservoir 40 and the article 30 provides a relatively clean and/or simple method for interacting with the refill reservoir 40 and article 30 which is convenient for the user to use to transfer aerosol-generating material.

Although it has been described above that the refilling device/dock 50 is provided to transfer source liquid from a refill reservoir 40 to an article 30, as discussed, other implementations may use other aerosol-generating materials (such as solids, e.g., tobacco). The principles of the present disclosure apply equally to other types of aerosol-generating material, and suitable refill reservoirs 40 and articles 30 for storing/holding the aerosol-generating materials, and a suitable transfer mechanism 53, may accordingly be employed by the skilled person for such implementations.

Hence, it has been described an article for storing aerosol-generating material and configured to be refilled with aerosol-generating material from a refilling device, the article a storage area for storing the aerosol-generating material; a valve arrangement in including communication with the storage area, the valve arrangement comprising: a septum arranged to cover an opening of the article in communication with the storage area, the septum comprising a first layer and a second layer, wherein the first layer is formed of a material that is relatively harder than a material forming the second layer. Also described is a refill reservoir having a valve arrangement comprising a septum, as well as a system and a method.

Hence, it has been described a refilling device for refilling an article for use with an aerosol provision device with aerosol-generating material, the refilling device including: a port for receiving at least the article to be refilled with aerosol-generating material; a transfer mechanism for causing aerosol-generating material to be transferred from a refill reservoir to an aerosol-generating material storage area of the article; and a nozzle arrangement arranged to engage with a valve arrangement including a septum, wherein the nozzle arrangement comprises an aerosol-generating material nozzle comprising a piercing element configured to pierce the septum, and wherein the aerosol-generating material nozzle comprises an aerosol-generating material pathway configured to allow aerosol-generating material to pass along the aerosol-generating material pathway via an aerosol-generating material opening in the aerosol-generating material nozzle, wherein the septum is arranged to cover an opening in at least one of the article and the refill reservoir. Also described is an article and a refill reservoir, in addition to a system and method.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An article for storing aerosol-generating material and configured to be refilled with aerosol-generating material from a refilling device, the article comprising:

- an engagement element, wherein the article is configured to be mechanically connected to an aerosol provision device through the engagement element cooperating with an engagement element of the aerosol provision device, and wherein the article and aerosol provision device are separate connectable parts that are detachable from one another by separation;
- a storage area for storing the aerosol-generating material;
- a valve arrangement in communication with the storage area, the valve arrangement comprising:
  - a septum arranged to cover an opening of the article in communication with the storage area, the septum comprising a first layer and a second layer, wherein the first layer is formed of a material that is relatively harder than a material forming the second layer.

2. The article of claim 1, wherein the first layer is arranged further from the storage area than the second layer.

3. The article of claim 1, wherein the first layer and the second layer both extend across the whole of the opening of the article in communication with the storage area.

4. The article of claim 1, wherein the first layer and the second layer are formed from different materials.

5. The article of claim 1, wherein the first layer and the second layer are formed from the same material, wherein the material is silicone, and wherein the first layer comprises silicone which is relatively harder than the silicone of the second layer.

6. The article of claim 1, wherein at least the second layer of the septum comprises a material capable of resealing when a piercing element of the refilling device is withdrawn from the septum.

7. The article of claim 1, wherein the septum comprises a weakened region in at least the first layer of the septum, wherein the weakened region comprises a piercing in the septum pierced in advance prior to engaging the refilling device with the article to refill the article.

8. The article of claim 1, wherein the septum is sized so as to be pierced at two different locations of the septum by a first piercing element of the refilling device and a second piercing element of the refilling device, wherein the septum comprises a second weakened region in at least the first layer of the septum, wherein the second weakened region provides less resistance to the second piercing element arranged to pierce the septum than the region of the septum not comprising a weakened region.

9. The article of claim 1, wherein the septum is a first septum and the article further comprises a second septum, wherein the first and second septa are provided at spatially separate and distinct locations of the article.

10. The article of claim 9, wherein the second septum is arranged to cover a second opening of the article in communication with the storage area.

11. The article of claim 9, wherein the second septum comprises a first layer and a second layer, wherein the first layer is formed of a material that is relatively harder than a material forming the second layer.

12. The article of claim 9, wherein the first septum is arranged at a location such that, when the article is engaged with the refilling device, a first piercing element of the refilling device is able to pierce the first septum and wherein the second septum is arranged at a location such that, when the article is engaged with the refilling device, a second piercing element of the refilling device is able to pierce the second septum.

13. The article of claim 1, wherein the article further comprises an aerosol-generating material transport element configured to transport aerosol-generating material from the storage area to an aerosol generator which, when activated, causes aerosol to be generated from the aerosol-generating material provided to the aerosol generator.

14. The article of claim 1, wherein the article further comprises an aerosol generator, the aerosol generator configured to, when activated, generate aerosol from the aerosol-generating material.

15. The article of claim 1, wherein the storage area is configured to store a liquid aerosol-generating material, wherein the septum is configured such that at least one layer of the septum is liquid impermeable.

16. A system for refilling an article with aerosol-generating material, the system comprising:

an article according to claim 1; and a refilling device, the refilling device comprising at least one piercing element arranged to pierce the septum of the article, the piercing element further configured for transferring aerosol-generating material to the storage area of the article via the septum.

17. The system of claim 16, further comprising a refill reservoir for storing aerosol-generating material and for use with a refilling device configured to refill an article with aerosol-generating material using the refilling device, the refill reservoir comprising:

a storage area for storing the aerosol-generating material; and a valve arrangement in communication with the storage area, the valve arrangement comprising:

a septum arranged to cover an opening of the refill reservoir in communication with the storage area, the septum comprising a first layer and a second layer, wherein the first layer is formed of a material that is relatively harder than a material forming the second layer wherein the refill reservoir is adapted to engage with the refilling device, and wherein the refilling device comprises at least one piercing element arranged to pierce the septum of the refill reservoir, the piercing element further configured for transferring aerosol-generating material from the storage area of the refill reservoir via the septum.

18. An article for storing aerosol-generating material and configured to be refilled with aerosol-generating material from a refilling means, the article comprising:

engagement means, wherein the article is configured to be mechanically connected to an aerosol provision device through the engagement means cooperating with an engagement means of the aerosol provision device, and wherein the article and aerosol provision device are separate connectable parts that are detachable from one another by separation;

storage means for storing the aerosol-generating material;

valve means in communication with the storage means, the valve means comprising:

septum means arranged to cover an opening of the article in communication with the storage means, the septum means comprising a first layer and a second layer, wherein the first layer is formed of a material that is relatively harder than a material forming the second layer.

* * * * *